United States Patent
Zhang et al.

(10) Patent No.: US 12,120,300 B2
(45) Date of Patent: Oct. 15, 2024

(54) RESTRICTION ON NUMBER OF CONTEXT CODED BINS

(71) Applicants: Beijing Bytedance Network Technology Co., Ltd., Beijing (CN); Bytedance Inc., Los Angeles, CA (US)

(72) Inventors: Li Zhang, San Diego, CA (US); Jizheng Xu, San Diego, CA (US); Kai Zhang, San Diego, CA (US); Hongbin Liu, Beijing (CN); Weijia Zhu, San Diego, CA (US)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 243 days.

(21) Appl. No.: 17/554,696

(22) Filed: Dec. 17, 2021

(65) Prior Publication Data
US 2022/0109845 A1    Apr. 7, 2022

Related U.S. Application Data

(63) Continuation of application No. PCT/CN2020/097478, filed on Jun. 22, 2020.

(30) Foreign Application Priority Data

Jun. 21, 2019  (WO) ................ PCT/CN2019/092365
Jul. 9, 2019   (WO) ................ PCT/CN2019/095329

(51) Int. Cl.
*H04N 19/13*   (2014.01)
*H04N 19/176*  (2014.01)
*H04N 19/70*   (2014.01)

(52) U.S. Cl.
CPC .......... *H04N 19/13* (2014.11); *H04N 19/176* (2014.11); *H04N 19/70* (2014.11)

(58) Field of Classification Search
CPC .... H04N 19/13; H04N 19/159; H04N 19/176; H04N 19/186; H04N 19/70
See application file for complete search history.

(56) References Cited

U.S. PATENT DOCUMENTS 10,148,961 B2   12/2018  Zhang et al.
10,205,968 B2   2/2019   Liu et al.
(Continued)

FOREIGN PATENT DOCUMENTS

CN    107710759 A    2/2018
EP    3270591 A2     1/2018
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Md N Haque
(74) *Attorney, Agent, or Firm* — Perkins Coie LLP

(57) ABSTRACT

Restrictions on number of context coded bins are described. A method for video processing includes applying, for a conversion between a video and a bitstream representation of the video, control on maximum number of context coded bins per predetermined unit which is associated with the video; and performing the conversion based on the control.

20 Claims, 26 Drawing Sheets

(56) References Cited

U.S. PATENT DOCUMENTS

| | | | |
|---|---|---|---|
| 10,368,072 | B2 | 7/2019 | Zhang et al. |
| 10,554,988 | B2 | 2/2020 | Said et al. |
| 10,574,993 | B2 | 2/2020 | Zhang et al. |
| 10,791,341 | B2 | 9/2020 | Said et al. |
| 10,869,062 | B2 | 12/2020 | Eglimez et al. |
| 2012/0082218 | A1 | 4/2012 | Misra et al. |
| 2015/0201220 | A1* | 7/2015 | Cheong ............... H04N 19/186 375/240.23 |
| 2016/0353113 | A1* | 12/2016 | Zhang .................. H04N 19/159 |
| 2019/0110080 | A1* | 4/2019 | Said ....................... H04N 19/13 |
| 2019/0200043 | A1* | 6/2019 | Egilmez ............... H04N 19/172 |
| 2020/0077117 | A1* | 3/2020 | Karczewicz .......... H04N 19/18 |
| 2021/0321140 | A1 | 10/2021 | Zhang et al. |
| 2022/0014790 | A1 | 1/2022 | Liu et al. |

FOREIGN PATENT DOCUMENTS

| | | | |
|---|---|---|---|
| KR | 20140090646 A | * | 11/2012 |
| WO | 2015194185 A1 | | 12/2015 |

OTHER PUBLICATIONS

De-Luxian-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

Karczewicz et al. "CE8-Related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.

Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.

Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0193, 2019.

Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.

Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018. document JVET-K0099, 2018.

https://vcgit.hhi.fraunhofer.de/jvet/VVCSoftware_VTM/-/tags/VTM-4.0.

International Search Report and Written Opinion from PCT/CN2020/097478 dated Sep. 25, 2020 (10 pages).

* cited by examiner

Example of encoder block diagram 67 intra prediction modes

Illustration of ALWIP for 8×4 blocks

Illustration of ALWIP for 16×16 blocks

Example of four reference lines neighboring to a prediction block

Example of division of 4 x 8 and 8 x 4 blocks

Example of division of all blocks except 4 x 8, 8 x 4 and 4 x 4

Secondary transform in JEM

Proposed Reduced Secondary Transform (RST)

An example of forward RST8x8 process with 16x48 matrix

Scanning the position 17 to 64 for non-zero element diagonal up-right scan order (4x4 as a CG for example)

diagonal up-right scan of 8x8 block (CG size: 4x4)

Illustration of the template used for selecting probability models. The black square specifies the current scan position and the blue squares represent the local neighbourhood used State transition and quantizer selection for the proposed dependent quantization

RESTRICTION ON NUMBER OF CONTEXT CODED BINS

CROSS-REFERENCE TO RELATED APPLICATION

This application is a continuation of International Application NO. PCT/CN2020/097478, filed on Jun. 22, 2020, which claims the priority to and benefits of International Patent Application No. PCT/CN2019/092365, filed on Jun. 21, 2019, and International Patent Application No. PCT/CN2019/095329, filed on Jul. 9, 2019. The entire disclosures of the aforementioned applications are incorporated by reference as part of the disclosure of this application.

TECHNICAL FIELD

This patent document is directed generally to video coding and decoding technologies.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes performing a conversion between a video unit and a bitstream representation of the video unit, wherein the conversion includes context modeling of the video unit based on a constraint applicable on a maximum number of context coded bins of a first processing unit associated with the video unit, wherein information of the context modeling is included in the bitstream representation of the video unit.

In another representative aspect, the disclosed technology may be used to provide another method for video processing. This method includes performing a conversion between a video unit and a bitstream representation of the video unit, wherein the conversion includes context modeling of the video unit based on a constraint applicable on a maximum number of context coded bins of a first processing unit associated with the video unit, wherein the conversion includes a step of grouping of processing units in accordance with contexts such that the first processing unit is associated with a first context and a second processing unit is associated with a second context.

In another representative aspect, the disclosed technology may be used to provide another method for video processing. This method includes performing a conversion between a video unit and a bitstream representation of the video unit, wherein the conversion includes context modeling of the video unit based on a constraint applicable on a maximum number of context coded bins of a first processing unit associated with the video unit, wherein a counter is used to record a number of context coded bins of the first processing unit, and wherein the counter is resettable when one or more conditions are met.

In another representative aspect, the disclosed technology may be used to provide another method for video processing. This method includes applying, for a conversion between a video and a bitstream representation of the video, control on maximum number of context coded bins per predetermined unit which is associated with the video; and performing the conversion based on the control.

In another representative aspect, the disclosed technology may be used to provide another method for video processing. This method includes dividing, for a conversion between a block of a video and a bitstream representation of the block, syntax elements associated with the block into different groups; applying separate controls on the different groups of syntax elements; and performing the conversion based on the controls.

In another representative aspect, the disclosed technology may be used to provide another method for video processing. This method includes dividing, for a conversion between a block of a video and a bitstream representation of the block, contexts used for residual coding associated with the block into different groups; applying separate controls on the different groups of contexts; and performing the conversion based on the controls.

In another representative aspect, the disclosed technology may be used to provide another method for video processing. This method includes applying, for a conversion between a video and a bitstream representation of the video, control on number of context coded bins per predetermined unit associated with the video by using one or multiple counters, wherein the counters are reset in a predefined way; and performing the conversion based on the counters.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Coding Flow of a Typical Video Codec

Figure 1:
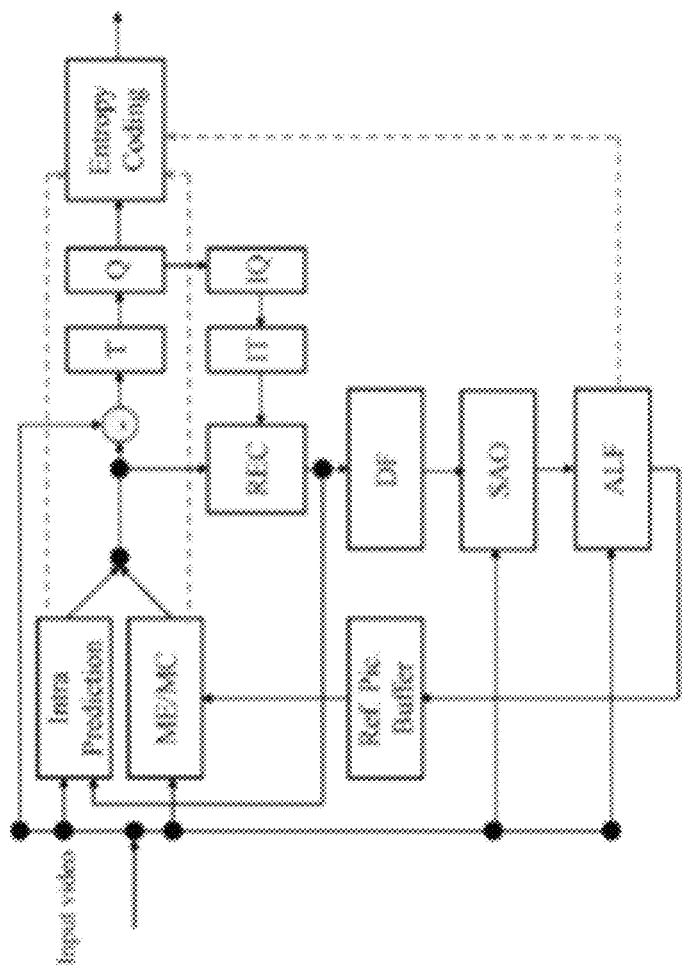
FIG. 1 shows an example of encoder block diagram.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2. Intra Coding in VVC 2.2.1. Intra Mode Coding with 67 Intra Prediction Modes To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
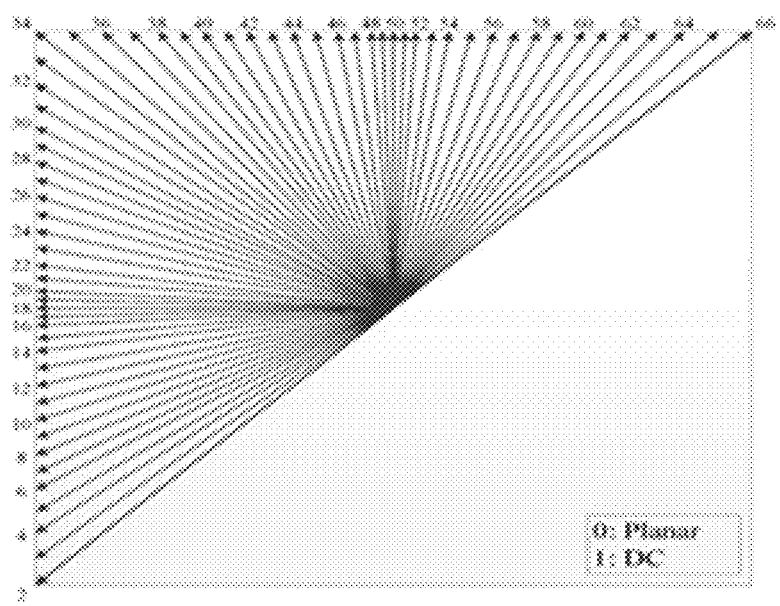
FIG. 2 shows an example of intra directional modes.
Figure 3:
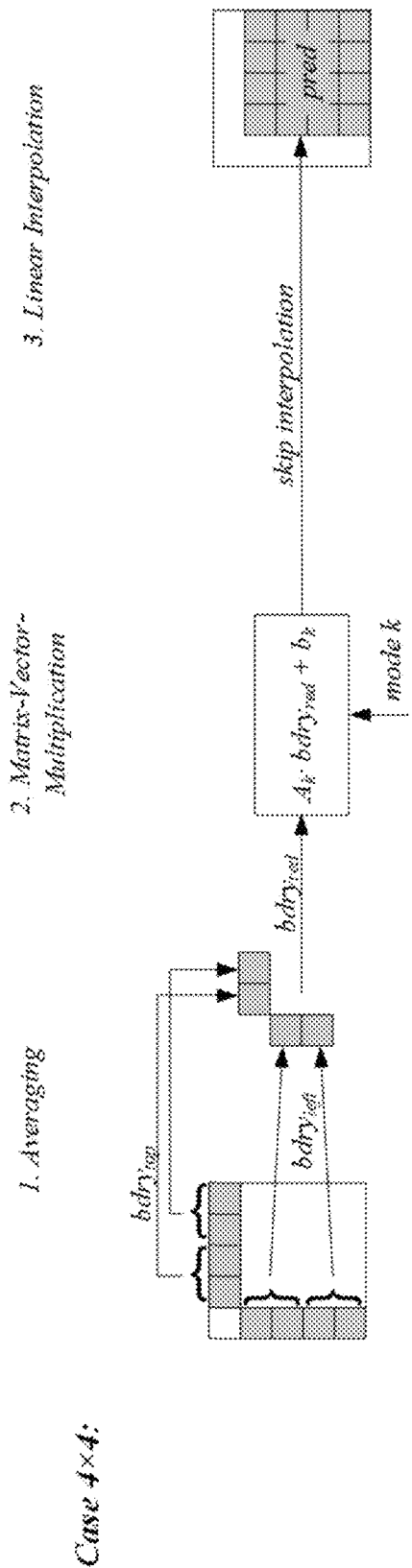
FIG. 3 shows an example of affine linear weighted intra prediction (ALWIP) for 4×4 blocks.
Figure 4:
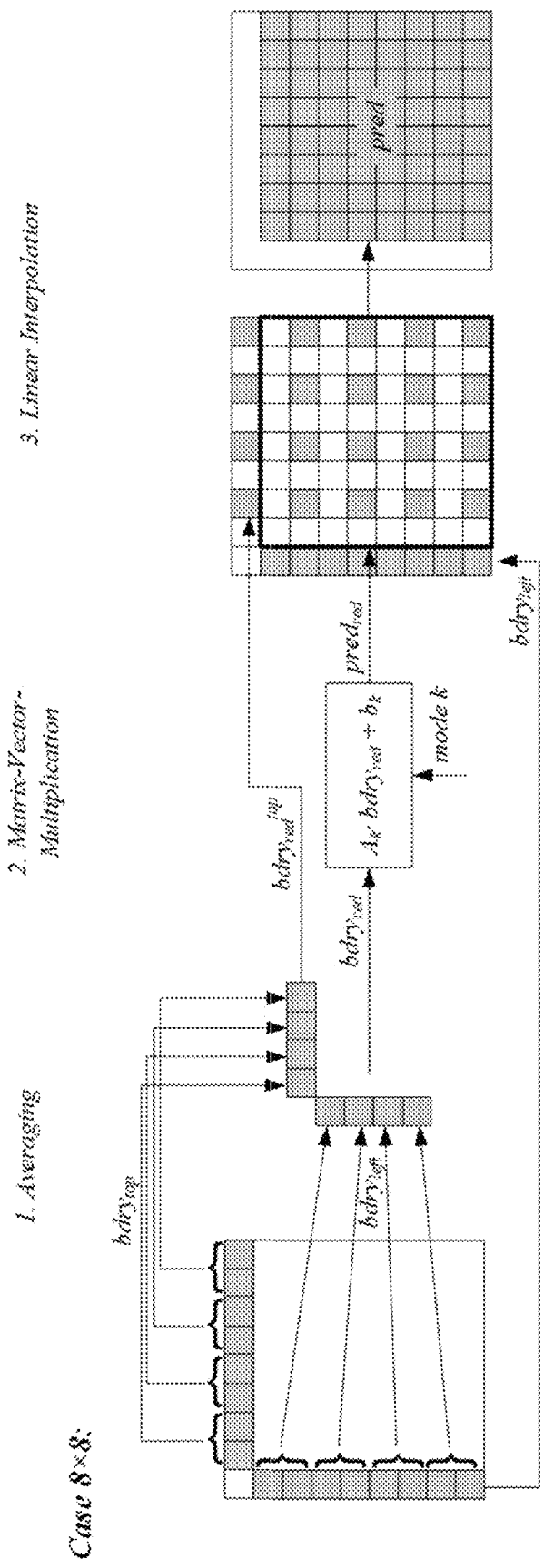
FIG. 4 shows an example of affine linear weighted intra prediction (ALWIP) for 8×8 blocks.
Figure 5:
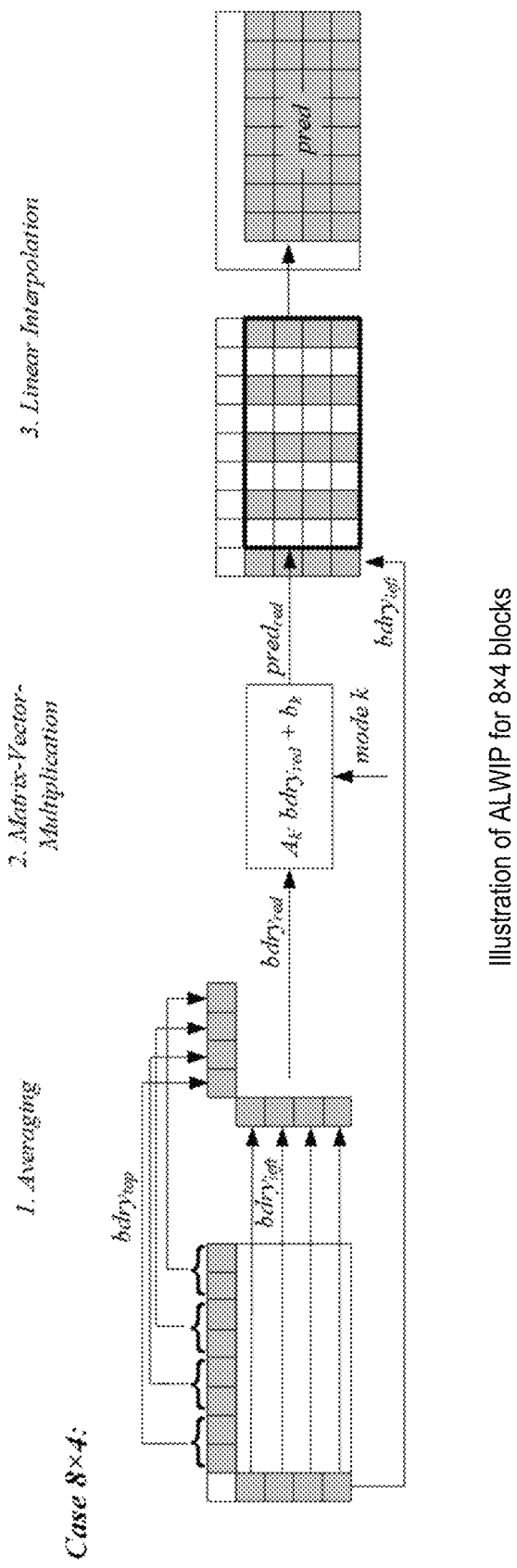
FIG. 5 shows an example of affine linear weighted intra prediction (ALWIP) for 8×4 blocks.
Figure 6:
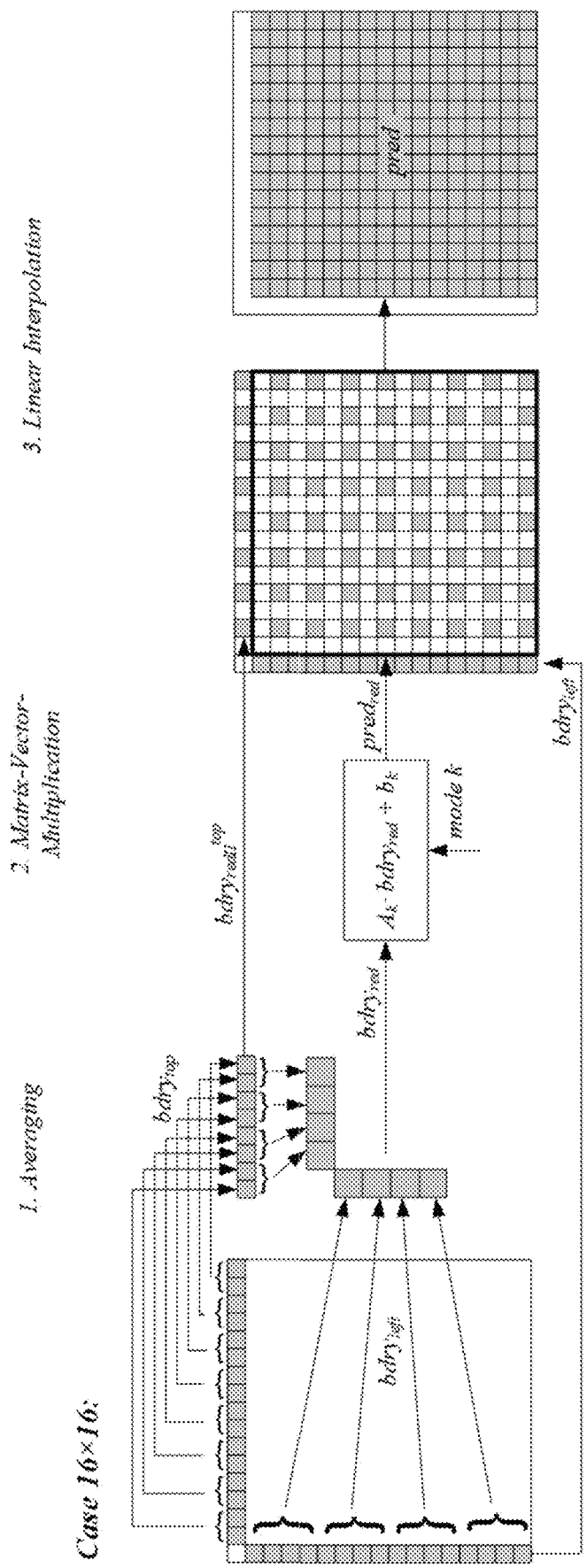
FIG. 6 shows an example of affine linear weighted intra prediction (ALWIP) for 16×16 blocks.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signalling: planar, DC, horizontal, vertical, bottom-left angular mode and its eight adjacent angular modes, and top-right angular mode and its eight adjacent angular modes.

2.2.2. Affine Linear Weighted Intra Prediction (ALWIP, a.k.a. Matrix Based Intra Prediction)

Affine linear weighted intra prediction (ALWIP, a.k.a. Matrix based intra prediction (MIP)) is proposed.

2.2.2.1. Generation of the Reduced Prediction Signal by Matrix Vector Multiplication The neighboring reference samples are firstly downsampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.2.2.2. Illustration of the Entire ALWIP Process

The entire process of averaging, matrix vector multiplication and linear interpolation is illustrated for different shapes in FIGS. 3-6. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.
2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are associated with calculating ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally, for W×4 blocks with W>8, let A_kbe the matrix that arises by leaving out every row that corresponds to an odd entry along the horizontal axis of the downsampled block. Thus, the output size is 32 and again, only horizontal interpolation remains to be performed.

The transposed cases are treated accordingly.

2.2.2.3. Syntax and Semantics 7.3.6.5 Coding Unit Syntax

The portions below in bold, italics and/or underlines indicate proposed modifications to the standard.

| coding_unit( x0, y0, cbWidth, cbHeight, treeType ) { | Descriptor |
|---|---|
|   if( tile_group_type != I \| \| sps_ibc_enabled_flag) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \| \| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \| \| treeType = = DUAL_TREE_LUMA ) { | |
|         *if( abs( Log2( cbWidth ) − Log2( cbHeight ) ) <= 2 )* | |
|           *intra_lwip_flag[ x0 ][ y0 ]* | *ae(v)* |
|         *if( intra_lwip_flag[ x0 ][ y0 ] ) {* | |
|           *intra_lwip_mpm_flag[ x0 ][ y0 ]* | *ae(v)* |
|           *if( intra_lwip_mpm_flag[ x0 ][ y0 ] )* | |
|             *intra_lwip_mpm_idx[ x0 ][ y0 ]* | *ae(v)* |
|           *else* | |
|             *intra_lwip_mpm_remainder[ x0 ][ y0 ]* | *ae(v)* |
|         *}* else { | |
|           if( ( y0 % CtbSizeY ) > 0 ) | |
|             intra_luma_ref_idx[ x0 ][ y0 ] | ae(v) |
|           if (intra_luma_ref_idx[ x0 ][ y0 ] = = 0 && | |
|             ( cbWidth <= MaxTbSizeY \| \| cbHeight <= MaxTbSizeY ) && | |
|             ( cbWidth * cbHeight > MinTbSizeY * MinTbSizeY )) | |
|             intra_subpartitions_mode_flag[ x0 ][ y0 ] | ae(v) |
|           if( intra_subpartitions_mode_flag[ x0 ][ y0 ] = = 1 && | |
|             cbWidth <= MaxTbSizeY && cbHeight <= MaxTbSizeY ) | |
|             intra_subpartitions_split_flag[ x0 ][ y0 ] | ae(v) |
|           if( intra_luma_ref_idx[ x0 ][ y0 ] = = 0 && | |
|             intra_subpartitions_mode_flag[ x0 ][ y0 ] = = 0 ) | |
|             intra_luma_mpm_flag[ x0 ][ y0 ] | ae(v) |
|           if( intra_luma_mpm_flag[ x0 ][ y0 ] ) | |
|             intra_luma_mpm_idx[ x0 ][ y0 ] | ae(v) |

```
coding unit( x0, y0, cbWidth, cbHeight, treeType ) {                     Descriptor
        else
            intra_luma_mpm_remainder[ x0 ][ y0 ]                         ae(v)
        }
    }
    if( treeType = = SINGLE_TREE | | treeType = =
DUAL_TREE_CHROMA )
        intra_chroma_pred_mode[ x0 ][ y0 ]                               ae(v)
    }
  } else if( treeType != DUAL_TREE_CHROMA ) {/* MODE_INTER or
MODE_IBC */
...
  }
}
```

2.2.3. Multiple Reference Line (MRL)

Figure 7:
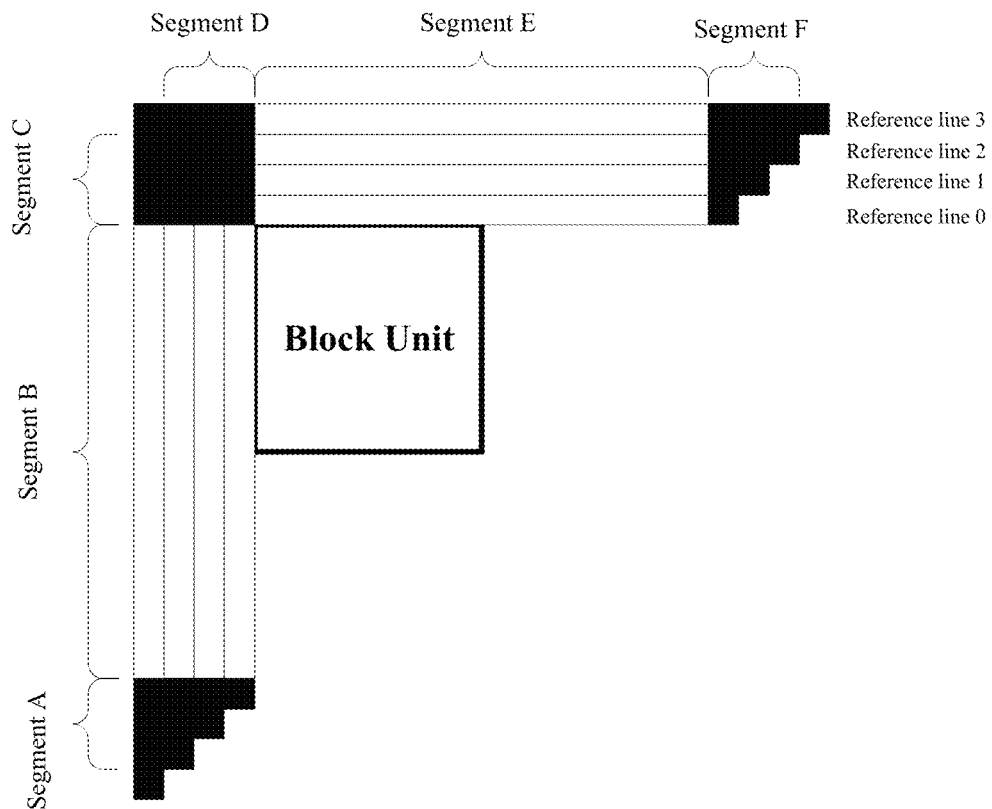
FIG. 7 shows an example of reference lines neighboring a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in MPM list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a CTU to prevent using extended reference samples outside the current CTU line. Also, PDPC is disabled when additional line is used.

2.2.4. Intra Subblock Partitioning (ISP)

Figure 8:
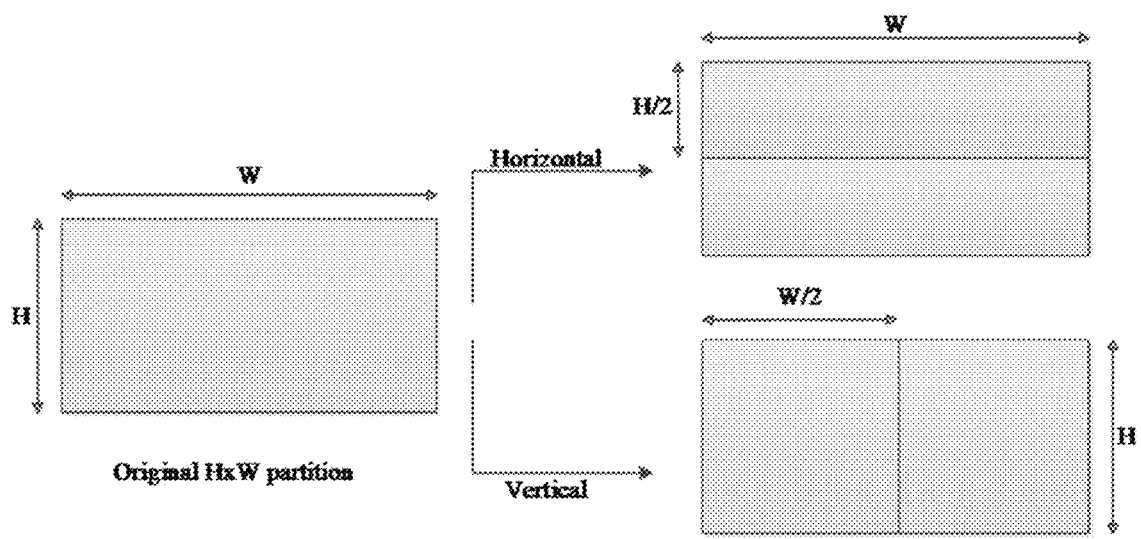
FIG. 8 shows examples of divisions of blocks.
Figure 9:
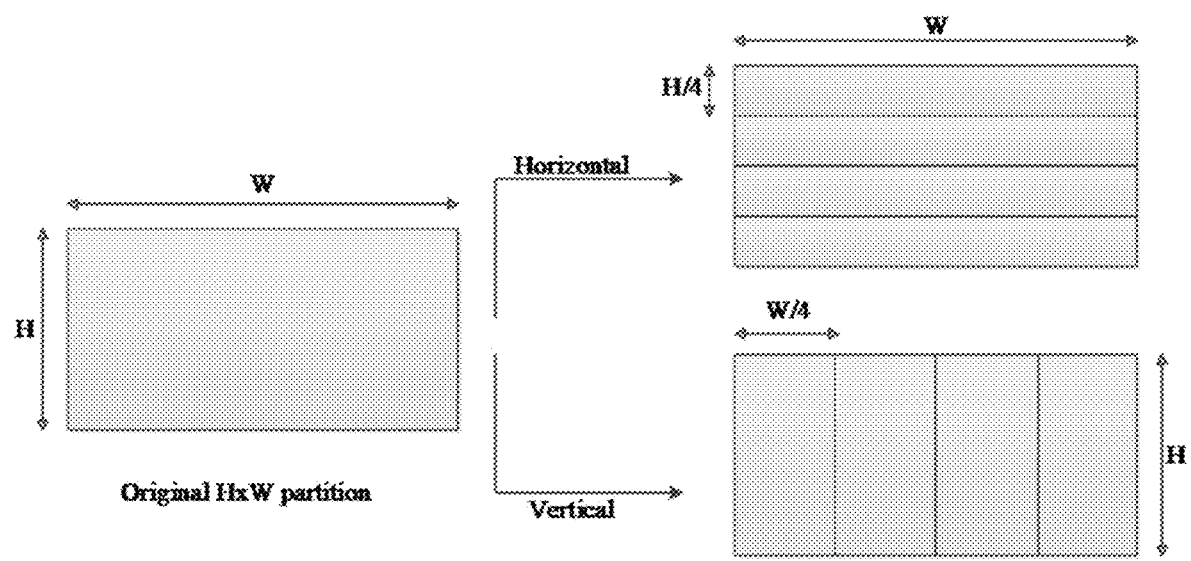
FIG. 9 shows examples of divisions of blocks with exceptions.

ISP is proposed, which divides luma intra-predicted blocks vertically or horizontally into 2 or 4 sub-partitions depending on the block size dimensions, as shown in Table 1. FIG. 8 and FIG. 9 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size
(denoted maximum transform size by maxTBSize)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTB Size and H <= maxTB Size | 4 |
| Horizontal | If not above cases and H > maxTB Size | 4 |
| Vertical | If not above cases and H > maxTB Size | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16) ? DST-VII:DCT-II | ( nTbH >= 4 && nTbH <= 16 ) ? DST-VII:DCT-II |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? DST-VII:DCT-II | DCT-II |

TABLE 2-continued

Specification of trTypeHor and trTypeVer depending on predModeIntra

| predModeIntra | trTypeHor | trTypeVer |
|---|---|---|
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | DCT-II | ( nTbH >= 4 && nTbH <= 16 ) ? DST-VII:DCT-II |

2.2.4.1. Syntax and Semantics
7.3.7.5 Coding Unit Syntax
The portions below in bold and/or underlines indicate proposed modifications to the standard.

| coding_unit( x0, y0, cbWidth, cbHeight, treeType) { | Descriptor |
|---|---|
|   if( slice_type != I \| \| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|   if( ( ( slice_type = = I && cu_skip_flag[ x0 ][ y0 ] = =0 ) \| \| | |
|     ( slice_type != I && CuPredMode[ x0 ][ y0 ] != MODE_INTRA ) ) && | |
|     sps_ibc_enabled_flag ) | |
|     pred_mode_ibc_flag | ae(v) |
|   } | |
|   if( CuPredMode[ x0 ][ y0 ] = = MODE_INTRA) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \| \| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY ) && | |
|           **( cbWidth * cbHeight> Min TbSizeY * MinTbSizeY ))** | |
|           intra_subpartitions_mode_flag[ x0 ][ y0 ] | ae(v) |
|         if(intra_subpartitions_mode_flag[ x0 ][ y0 ] = = 1 && | |
|           cbWidth <= MaxTbSize Y && cbHeight <= MaxTbSizeY) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \| \| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|   . . . | |
|   } | |
|   . . . | |
| } | | intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra subpartitions split flag[x0][y0] is not present, it is inferred as follows:

If cbHeight is greater than MaxTb SizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 3. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 3

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:
  cbWidth is equal to 4 and cbHeight is equal to 8,
  cbWidth is equal to 8 and cbHeight is equal to 4.

Otherwise, NumIntraSubPartitions is set equal to 4.

2.3. Transform Coding in VVC 2.3.1. Multiple Transform Set (MTS) in VVC 2.3.1.1. Explicit Multiple Transform Set (MTS)

In VTM4, large block-size transforms, up to 64×64 in size, are enabled, which is primarily useful for higher resolution video, e.g., 1080p and 4 K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. Ruses multiple selected transforms from the DCT8/DST7. The newly introduced transform matrices are DST-VII and DCT-VIII. The Table 4 below shows the basis functions of the selected DST/DCT.

TABLE 4

Basis functions of transform matrices used in VVC.

| Transform Type | Basis function $T_i(j)$, $i, j = 0, 1, \ldots, N - 1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.3.2. Reduced Secondary Transform (RST)

2.3.2.1. Non-Separable Secondary Transform (NSST) in JEM

Figure 10:
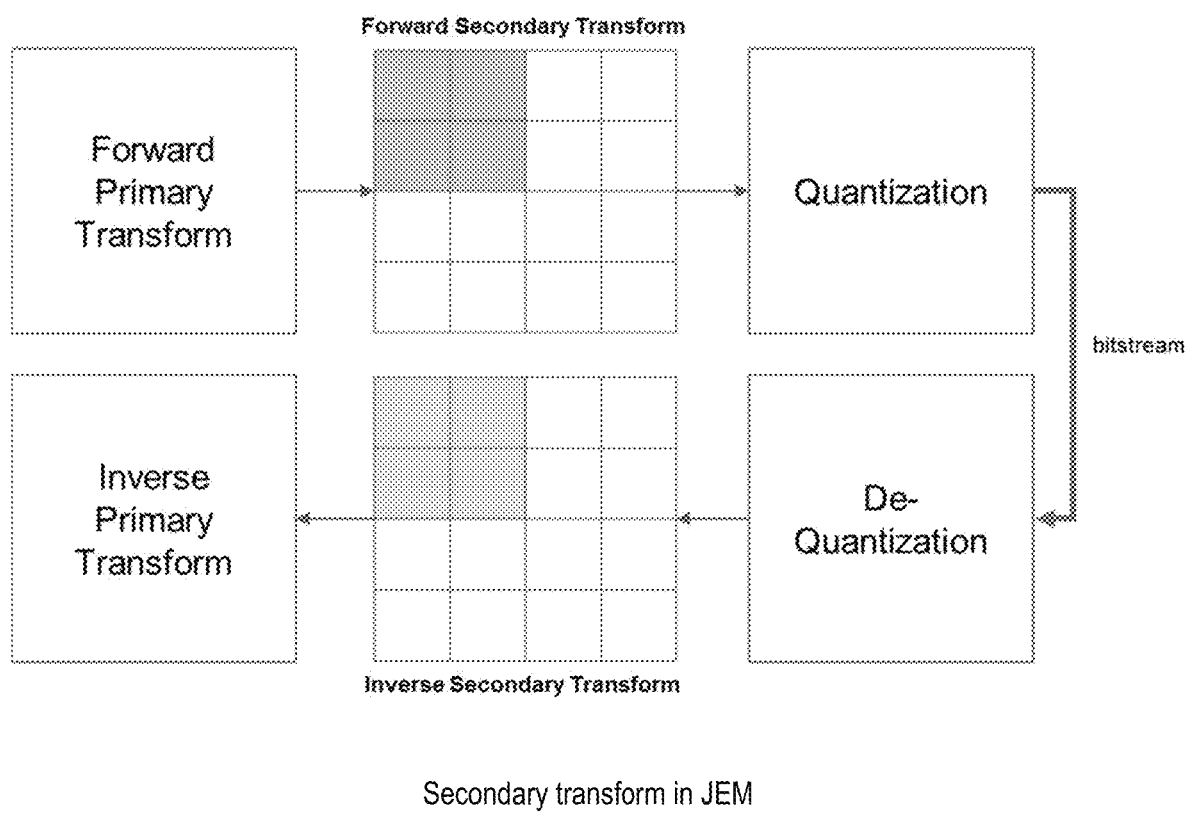
FIG. 10 shows examples of secondary transforms.

In JEM, secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.3.2.2. Reduced Secondary Transform (RST)

Figure 11:
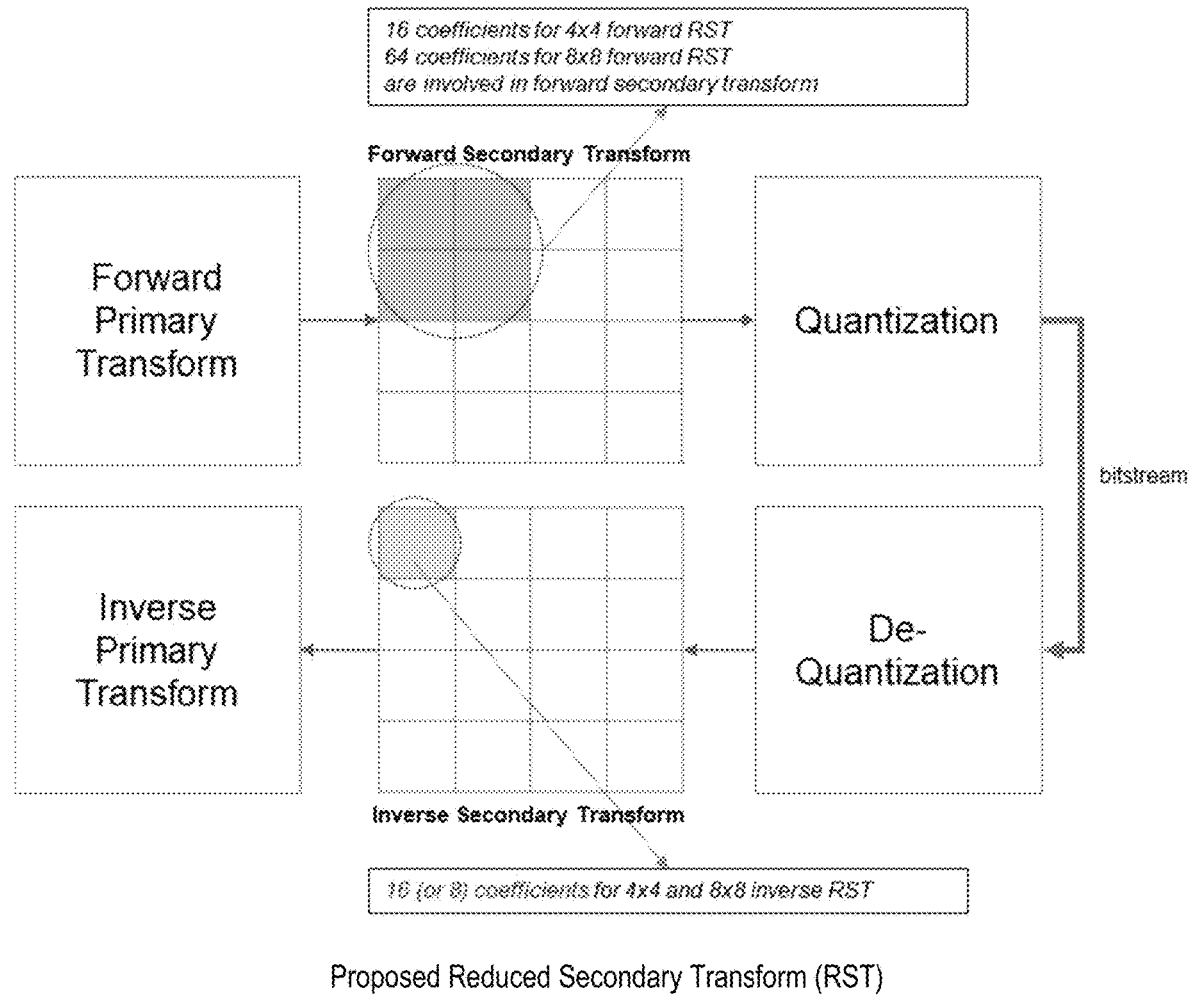
FIG. 11 shows an example of reduced secondary transform (RST).

The RST (a.k.a. Low Frequency Non-Separable Transform (LFNST)) was introduced and 4 transform set (instead of 35 transform sets) mapping was also introduced. 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

2.3.2.2.1. RST Computation

The main idea of a Reduced Transform (RT) is to map an N dimensional vector to an R dimensional vector in a different space, where R/N (R<N) is the reduction factor.

Figure 12:
FIG. 12 shows examples of forward and invert reduced transforms.

The RT matrix is an R×N matrix as follows:

$$T_{R \times N} = \begin{bmatrix} t_{11} & t_{12} & t_{13} & & t_{1N} \\ t_{21} & t_{22} & t_{23} & \cdots & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 12.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

2.3.2.2.2. Restriction of RST

When ISP mode is selected, RST is disabled, and RST index is not signaled, because performance improvement was marginal even if RST is applied to every feasible partition block. Furthermore, disabling RST for ISP-predicted residual could reduce encoding complexity.

2.3.2.2.3. RST Selection

A RST matrix is chosen from four transform sets, each of which consists of two transforms. Which transform set is applied is determined from intra prediction mode as the following 1) If one of three CCLM modes is indicated, transform set 0 is selected.
2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |

-continued

The transform set selection table

| IntraPredMode | Tr. set index |
|---|---|
| 24 <= IntraPredMode <= 44 | 3 |
| 45 <= IntraPredMode <= 55 | 2 |
| 56 <= IntraPredMode | 1 |

The index to access the Table, denoted as IntraPredMode, have a range of [−14, 83], which is a transformed mode index used for wide angle intra prediction.

2.3.2.2.4. RST Matrices of Reduced Dimension

Figure 13:
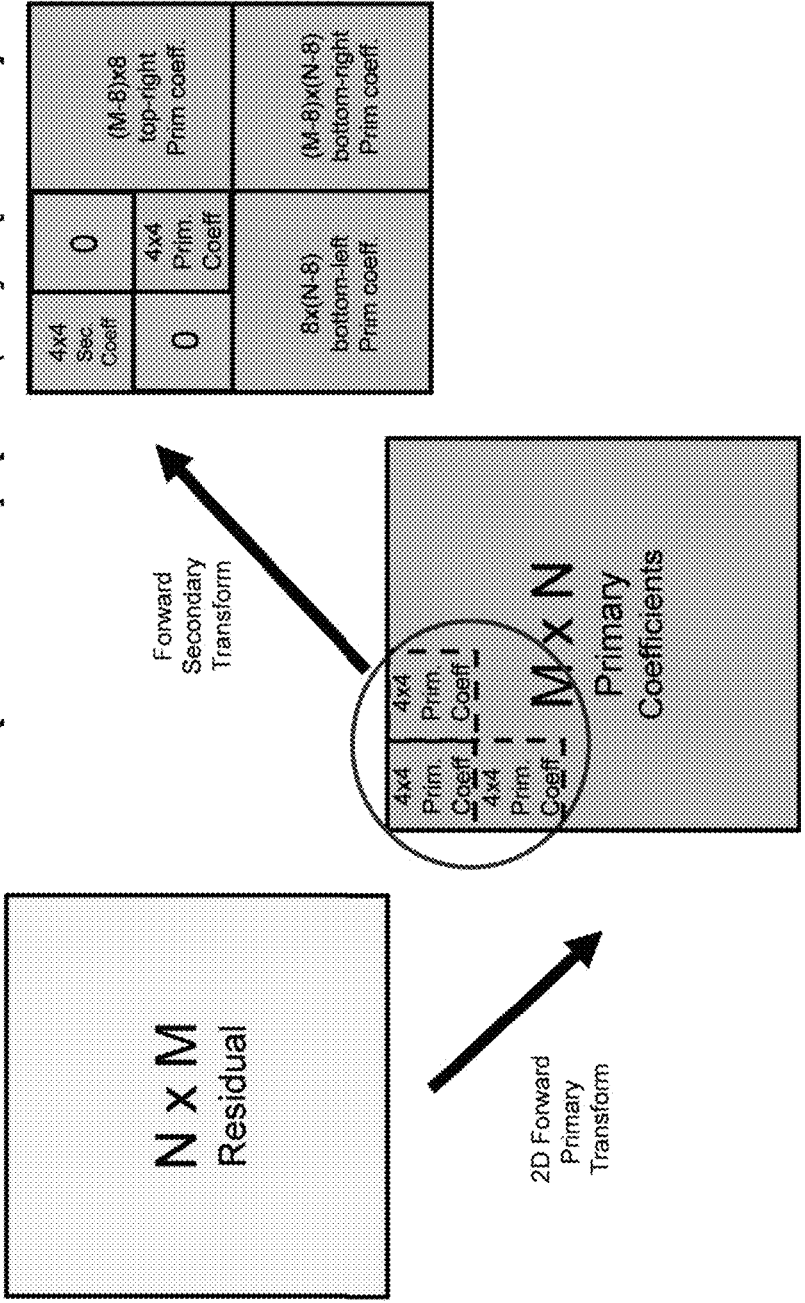
FIG. 13 shows an example of forward RST.

As a further simplification, 16×48 matrices are applied instead of 16×64 with the same transform set configuration, each of which takes 48 input data from three 4×4 blocks in a top-left 8×8 block excluding right-bottom 4×4 block (FIG. 13).

2.3.2.2.5. RST Signalling

Figure 14:
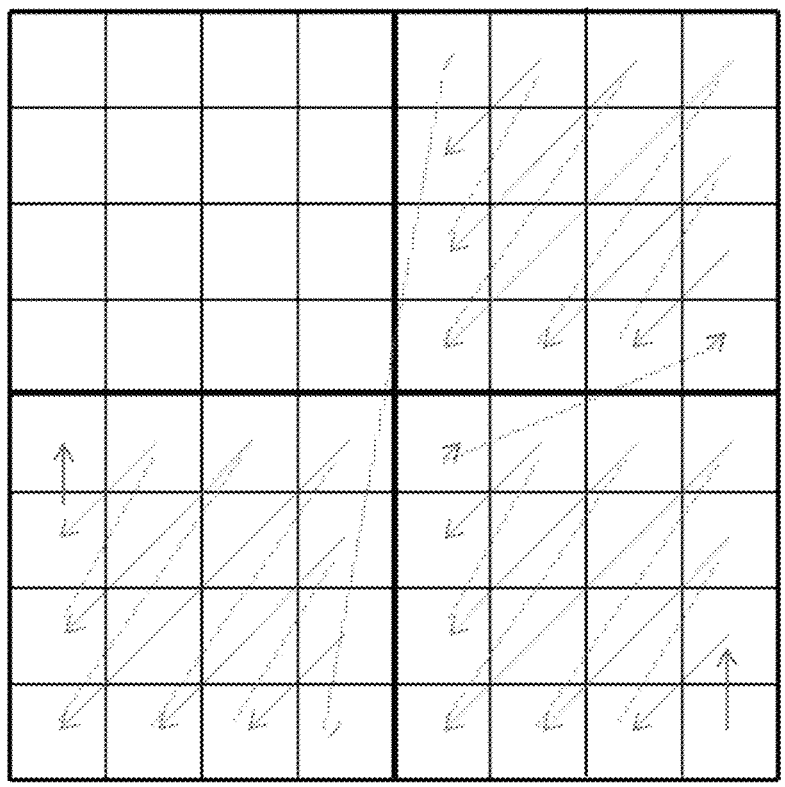
FIG. 14 shows an example of RST scanning.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

2.3.2.2.6. Zero-Out Range

Usually, before applying the invert RST on a 4×4 sub-block, any coefficient in the 4×4 sub-block may be non-zero.

However, it is constrained that in some cases, some coefficients in the 4×4 sub-block are zero before invert RST is applied on the sub-block.

Let nonZeroSize be a variable. Any coefficient with the index no smaller than nonZeroSize when it is rearranged into a 1-D array before the invert RST, can be zero.

When nonZero Size is equal to 16, there is no zero-out constrain on the coefficients in the top-left 4×4 sub-block.

When the current block size is 4×4 or 8×8, nonZero Size is set equal to 8. For other block dimensions, nonZeroSize is set equal to 16.

2.3.2.2.7. Description of RST in Working Draft 7.3.2.3 Sequence Parameter Set RBSP Syntax The portions below in bold, italic and/or underlines indicate proposed modifications to the standard.

| | Descriptor |
|---|---|
| seq_parameter_set_rbsp( ) { | |
| ...... | |
| sps_mts_enabled_flag | u(1) |
| if( sps_mts_enabled_flag) { | |
| sps_explicit_mts_intra_enabled_flag | u(1) |
| sps_explicit_mts_inter_enabled_flag | u(1) |
| } | |
| ... | |
| *sps_st_enabled_flag* | u(1) |
| ... | |
| } | |

7.3.7.11 Residual Coding Syntax

The portions below in bold, italic and/or underlines indicate proposed modifications to the standard.

| | Descriptor |
|---|---|
| residual_coding( x0, y0, log2TbWidth, log2TbHeight, cIdx ) { | |
| ... | |
| if( coded_sub_block flag[ xS ][ yS ] && ( n > 0 \|\| !inferSbDcSigCoeffFlag ) && | |
| ( xC != LastSignificantCoeffX \|\| yC != Last SignificantCoeffY ) ) { | |
| sig_coeff_flag[ xC ][ yC ] | ae(v) |
| remBinsPass1-- | |
| if( sig_coeff_flag[ xC ][ yC ] ) | |
| inferSbDcSigCoeffFlag = 0 | |
| } | |
| if( sig_coeff_flag[ xC ][ yC ]) { | |
| *if( !transform_skip_flag[ x0 ][ y0 ]) {* | |
| *numSigCoeff++* | |
| ***if( ( ( ( log2TbWidth == 2 && log2TbHeight == 2 ) \|\|*** | |
| ***( log2TbWidth == 3 && log2TbHeight == 3 ) ) && n >= 8 && i == 0 ) \|\|*** | |
| *( (log2TbWidth >= 3 && log2TbHeight >= 3 && ( i == 1 \|\| i == 2 ) ) ) ) {* | |
| *numZeroOutSigCoeff++* | |
| *}* | |
| *}* | |
| abs_level_gt1_flag[ n ] | ae(v) |
| ... | |

7.3.7.5 Coding Unit Syntax

The portions below in bold, italic and/or underlines indicate proposed modifications to the standard.

| | Descriptor |
|---|---|
| coding_unit( x0, y0, cbWidth, cbHeight, treeType) { | |
| ... | |
| if( !pcm_flag[ x0 ][ y0 ] ) { | |
| if( CuPredMode[ x0 ][ y0 ] != MODE_INTRA && merge_flag[ x0 ][ y0 ] == 0) | |
| cu_cbf | ae(v) |
| if( cu_cbf) { | |

|  | Descriptor |
|---|---|
| `if( CuPredMode[ x0 ][ y0 ] == MODE_INTER && sps_sbt_enabled_flag &&`<br>`  !ciip_flag[ x0 ][ y0 ]) {`<br>`  if( cbWidth <= MaxSbtSize && cbHeight <= MaxSbtSize) {`<br>`    allowSbtVerH = cbWidth >= 8`<br>`    allowSbtVerQ = cbWidth >= 16`<br>`    allowSbtHorH = cbHeight >= 8`<br>`    allowSbtHorQ = cbHeight >= 16`<br>`    if( allowSbtVerH || allowSbtHorH || allowSbtVerQ || allowSbtHorQ)`<br>`      cu_sbt_flag` | ae(v) |
| `  }`<br>`  if( cu_sbt_flag) {`<br>`    if( ( allowSbtVerH || allowSbtHorH) && ( allowSbtVerQ || allowSbtHorQ))`<br>`      cu_sbt_quad_flag` | ae(v) |
| `    if( ( cu_bt_quad_flag && allowSbtVerQ && allowSbtHorQ ) ||`<br>`      ( !cu_sbt_quad_flag && allowSbtVerH && allowSbtHorH))`<br>`      cu_sbt_horizontal_flag`<br>`    cu_sbt_pos_flag`<br>`  }`<br>`}` | ae(v)<br>ae(v) |
| *numZeroOutSigCoeff=0*<br>*transform_tree(x0, y0, cbWidth, cbHeight, treeType)*<br>*if( Min( cbWidth, cbHeight ) >= 4 && sps_st_enabled_flag == 1 &&*<br>*CuPredMode[ x0 ][ y0 ] = = MODE_INTRA*<br>*&& IntraSubPartitionsSplitType == ISP_NO_SPLIT) {*<br>*  if( ( numSigCoeff>( (treeType == SINGLE_TREE)? 2 : 1 ) ) &&*<br>*numZeroOutSigCoeff == 0 ) {*<br>*    st_idx[ x0 ][ y0 ]* | *ae(v)* |
| *  }*<br>*}*<br>`  }`<br>`}`<br>`}` | | sps_st_enabled_flag equal to 1 specifies that st_idx may be present in the residual coding syntax for intra coding units. sps_st_enabled_flag equal to 0 specifies that st_idx is not present in the residual coding syntax for intra coding units.

st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

Bins of st_idx are context-coded. More specifically, the following applies:

TABLE 6

Syntax elements and associated binarizations

| Syntax structure | Syntax element | Process | Input parameters |
|---|---|---|---|
| ... | ... | ... | ... |
| | *st_idx[ ][ ]* | *TR* | *cMax = 2, cRiceParam = 0* |
| | ... | ... | ... |

TABLE 7

Assignment of ctxInc to syntax elements with context coded bins

| Syntax element | binIdx | | | | | |
|---|---|---|---|---|---|---|
| | 0 | 1 | 2 | 3 | 4 | >= 5 |
| ... | ... | ... | ... | ... | ... | ... |
| *st_idx[ ][ ]* | *0, 1, 4, 5*<br>*(clause 9.5.4.2.8)* | *2, 3, 6, 7*<br>*(clause 9.5.4.2.8)* | *na* | *na* | *na* | *na* |
| ... | ... | ... | ... | ... | ... | ... |

9.5.4.2.8 Derivation process of ctxInc for the syntax element st_idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, and the multiple transform selection index tu_mts_idx[x0][y0]. Output of this process is the variable ctxInc.

The variable intraModeCtx is derived as follows:

If cIdx is equal to 0, intraModeCtx is derived as follows:
  intraModeCtx=(IntraPredModeY[x0][y0]<=1)?1:0

Otherwise (cIdx is greater than 0), intraModeCtx is derived as follows:
  intraModeCtx=(intra_chroma_pred_mode[x0][y0]>=4)?1:0

The variable mtsCtx is derived as follows:
  mtsCtx=(tu_mts_idx[x0][y0]
    0&&treeType!=SINGLE_TREE)?1:0

The variable ctxInc is derived as follows:
ctxInc=(binIdx<<1)+intraModeCtx+(mtsCtx<<2)

2.3.2.2.8. Summary of RST Usage

RST may be enabled only when _the number of non-zero coefficients in one block is greater than 2 and 1 for single and separate tree_, respectively. In addition, the following restrictions of locations of non-zero coefficients for RST applied coding groups (CGs) can be applied when RST is enabled.

TABLE 8

Usage of RST

Figure 16:
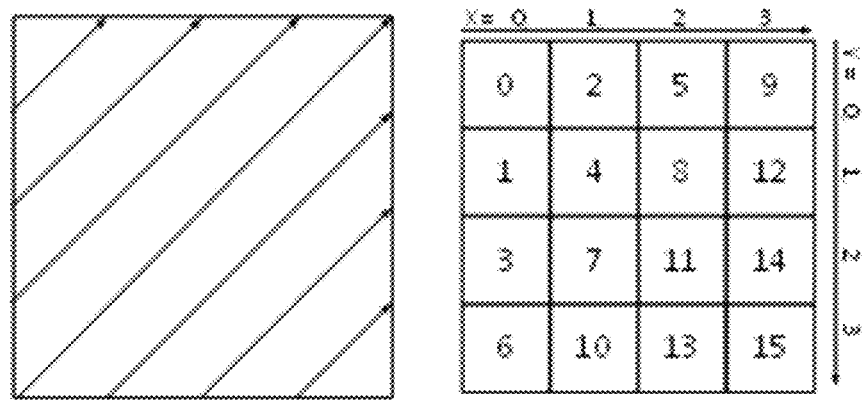
FIG. 16 shows an example of a scanning order.

| Block size | RST type | # of CGs that RST applied to | Which CG that RST applied to may have non-zero coeffs | Potential locations of non-zero coeffs in the CGs RST applied to (nonZeroSize relative to one CG) |
|---|---|---|---|---|
| 4 × 4 | RST4 × 4 (16 × 16) | 1 (Top-left 4 × 4) | Top-left 4 × 4 | First 8 in diagonal scan order (0 . . . 7 in FIG. 16, _nonZeroSize = 8_ |
| 4 × 8/8 × 4 | RST4 × 4 (16 × 16) | 1 (Top-left 4 × 4) | Top-left 4 × 4 | all, nonZero Size = 16 |
| 4 × N and N × 4 (N > 8) | RST4 × 4 (16 × 16) | 2 (4 × N: up most 4 × 8; N × 4: left most 4 × 8) | 4 × N: up most 4 × 8; N × 4: left most 4 × 8 | all, nonZero Size = 16 |
| 8 × 8 | RST8 × 8 (16 × 48) | 3 (with only 1 CG may have non-zero coeffs after forward RST) | Top-left 4 × 4 | First 8 in diagonal scan order (0 . . . 7 in FIG. 16), _nonZeroSize = 8_ |
| Others (W * H, W > 8, H > 8) | RST8 × 8 (16 × 48) | 3 (with only 1 CG may have non-zero coeffs after forward RST) | Top-left 4 × 4 | all, nonZero Size = 16 |

2.3.3. Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case (i.e., SBTis enabled), a part of the residual block is coded with inferred adaptive transform and the other part of the residual block is zeroed out. The SBT is not applied to the combined inter-intra mode and triangular prediction mode.

Figure 15:
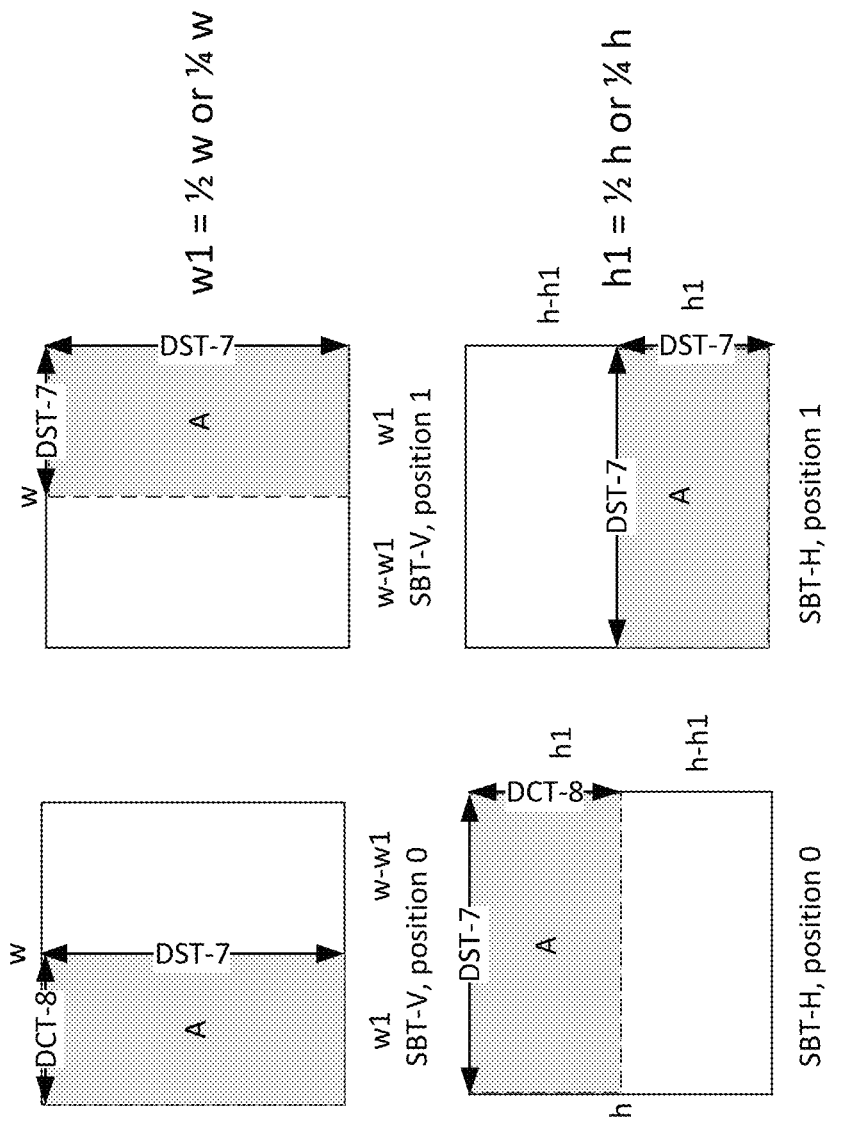
FIG. 15 shows examples of sub-block transform modes.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.3.3.1. Syntax Elements 7.3.7.5 Coding Unit Syntax

The portions below in bold, italics and/or underlines indicate proposed modifications to the standard.

| | Descriptor |
|---|---|
| coding_unit( x0, y0, cbWidth, cbHeight, treeType ) { | |
|   if( slice_type != I \| \| sps_ibc_enabled_flag) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && slice_type != I) | |
|       pred_mode_flag | ae(v) |
|     if( ( ( slice_type == I && cu_skip_flag[ x0 ][ y0 ] ==0) \|\| | |
|       ( slice_type !-I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] == MODE_INTRA) { | |
|     ... | |
|   } else if( treeType != DUAL_TREE_CHROMA ) { /* MODE_INTER or MODE_IBC */ | |
|     ... | |
|   } | |

| | Descriptor |
|---|---|
| if( !pcm_flag[ x0 ][ y0 ] ) {<br>  if( CuPredMode[ x0 ][ y0 ] != MODE_INTRA &&<br>merge_flag[ x0 ][ y0 ] == 0)<br>    cu_cbf | ae(v) |
|   if(cu_cbf) {<br>    *if( CuPredMode[ x0 ][ y0 ] = = MODE_INTER &&*<br>*sps_sbt_enabled_flag &&*<br>    *!ciip_flag[ x0 ][ y0 ] ) {*<br>    *if( cbWidth <= MaxSbtSize && cbHeight <= MaxSbtSize ) {*<br>    *allowSbtVerH = cbWidth >= 8*<br>    *allowSbtVerQ = cbWidth >= 16*<br>    *allowSbtHorH = cbHeight >= 8*<br>    *allowSbtHorQ = cbHeight >= 16*<br>    *if( allowSbtVerH \|\| allowSbtHorH \|\| allowSbtVerQ \|\|*<br>*allowSbtHorQ )*<br>    *cu_sbt_flag* | *ae(v)* |
|     *}*<br>    *if( cu_sbt_flag ) {*<br>    *if( ( allowSbtVerH \|\| allowSbtHorH ) && ( allowSbtVerQ \|\|*<br>*allowSbtHorQ) )*<br>    *cu_sbt_quad_flag*<br>    *if( ( cu_sbt_quad_flag && allowSbtVerQ && allowSbtHorQ)*<br>\|\|<br>    *( !cu_sbt_quad_flag && allowSbtVerH &&*<br>*allowSbtHorH ) )* | *ae(v)* |
|     *cu_sbt_horizontal_flag*<br>    *cu_sbt_pos_flag* | *ae(v)*<br>*ae(v)* |
|     *}*<br>    *}*<br>    transform_tree( x0, y0, cbWidth, cbHeight, treeType )<br>  }<br> }<br>} | | cu_sbt_flag equal to 1 specifies that for the current coding unit, subblock transform is used.

cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad_flag is not present, its value is inferred to be equal to 0.

cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units.

When cu_sbt_horizontal_flag is not present, its value is derived as follows:

If cu_sbt_quad_flag is equal to 1, cu_sbt_horizontal_flag is set to be equal to allowSbtHorQ.

Otherwise (cu_sbt_quad_flag is equal to 0), cu_sbt_horizontal_flag is set to be equal to allowSbtHorH.

cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.

The variable SbtNumFourthsTbO is derived as follows:

$$sbtMinNumFourths = cu\_sbt\_quad\_flag?1:2 \quad (7\text{-}117)$$

$$SbtNumFourthsTbO = cu\_sbt\_pos\_flag?(4-sbtMin\\NumFourths):sbtMinNumFourths \quad (7\text{-}118)$$

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize = sps\_sbt\_max\_size\_64\_flag?64:32 \quad (7\text{-}33)$$

2.3.4. Quantized Residual Domain Block Differential Pulse-Code Modulation Coding (QR-BDPCM)

Quantized residual domain BDPCM (denote as QR-BDPCM hereinafter) is proposed. Different from BDPCM, the intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \Sigma_{k=0}^{i} \tilde{r}_{k,j}, 0 \le i \le (M-1), 0 \le j \le (N-1).$$

For horizontal case, $$Q(r_{i,j}) = \Sigma_{k=0}^{j} \tilde{r}_{i,k}, 0 \le i \le (M-1), 0 \le j \le (N-1).$$

The invert quantized residuals, $Q^{-1} (Q (r_{i,j}))$, are added to the intra block prediction values to produce the reconstructed sample values.

Transform skip is always used in the QR-BDPCM.

2.4. Entropy Coding of Coefficients
2.4.1. Coefficients Coding of Transform-Applied Blocks In HEVC, transform coefficients of a coding block are coded using non-overlapped coefficient groups (CG, or subblocks), and each CG contains the coefficients of a 4×4 block of a coding block. The CGs inside a coding block, and the transform coefficients within a CG, are coded according to pre-defined scan orders.

Figure 17:
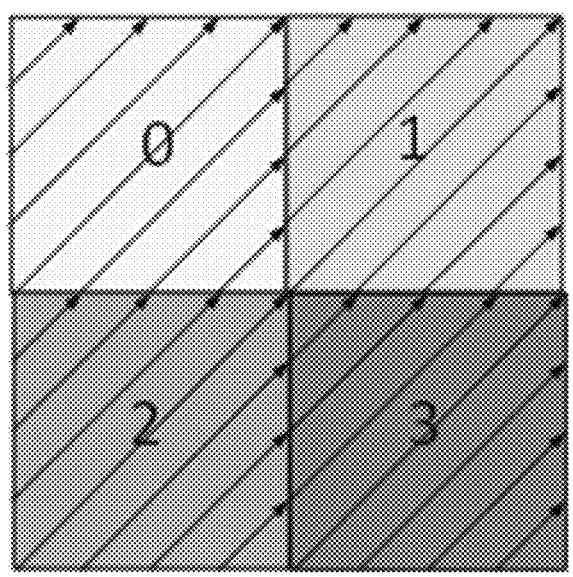
FIG. 17 shows another example of a scanning order.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 16 and FIG. 17, respectively.

Note that the coding order is the reversed scanning order (i.e., decoding from CG3 to CG0 in FIG. 17), when decoding one block, the last non-zero coefficient's coordinate is firstly decoded.

The coding of transform coefficient levels of a CG with at least one non-zero transform coefficient may be separated into multiple scan passes. In the VVC 3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

Pass 1: coding of significance (sig_flag), greater 1 flag (gt1_flag), parity (par_level_flag) and greater 2 flags (gt2 flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).

Pass 2: coding of remaining absolute level (remainder) is processed for all scan positions with gt2 flag equal to 1 or gt1_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) for all scan positions with sig_coeff_flag equal to 1

It is guaranteed that no more than 32 regular-coded bins (sig_flag, par_flag, gt1_flag and gt2 flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), code-Value is set equal to absLevel[k].

The value of codeValue is coded using a Golomb-Rice code with Rice parameter ricePar.

2.4.1.1. Context Modeling for Coefficient Coding

Figure 18:
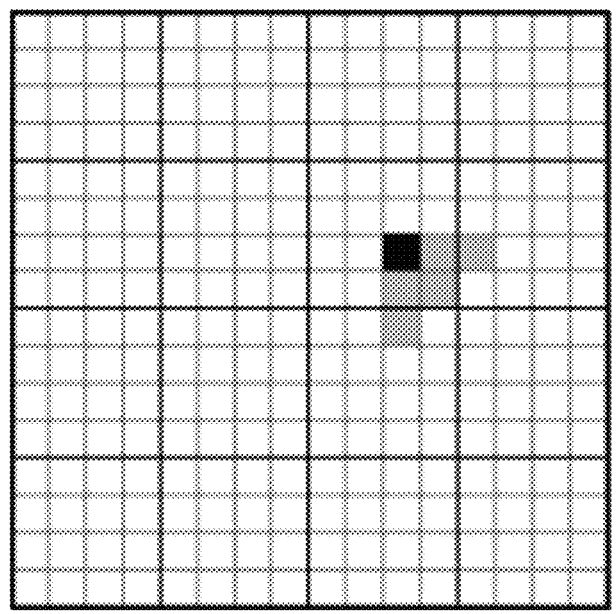
FIG. 18 shows an example template used for selecting a probability model.

The selection of probability models for the syntax elements related to absolute values of transform coefficient levels depends on the values of the absolute levels or partially reconstructed absolute levels in a local neighbourhood. The template used is illustrated in FIG. 18.

The selected probability models depend on the sum of the absolute levels (or partially reconstructed ab solute levels) in a local neighbourhood and the number of ab solute levels greater than 0 (given by the number of sig_coeff_flags equal to 1) in the local neighbourhood. The context modelling and binarization depends on the following measures for the local neighbourhood:

numSig: the number of non-zero levels in the local neighbourhood, sumAbs1: the sum of partially reconstructed absolute levels (absLevel1) after the first pass in the local neighbourhood, sumAbs: the sum of reconstructed absolute levels in the local neighbourhood, and diagonal position (d): the sum of the horizontal and vertical coordinates of a current scan position inside the transform block.

Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

2.4.1.2. Dependent Quantization (DQ)

In addition, the same HEVC scalar quantization is used with a new concept called dependent scale quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 19:
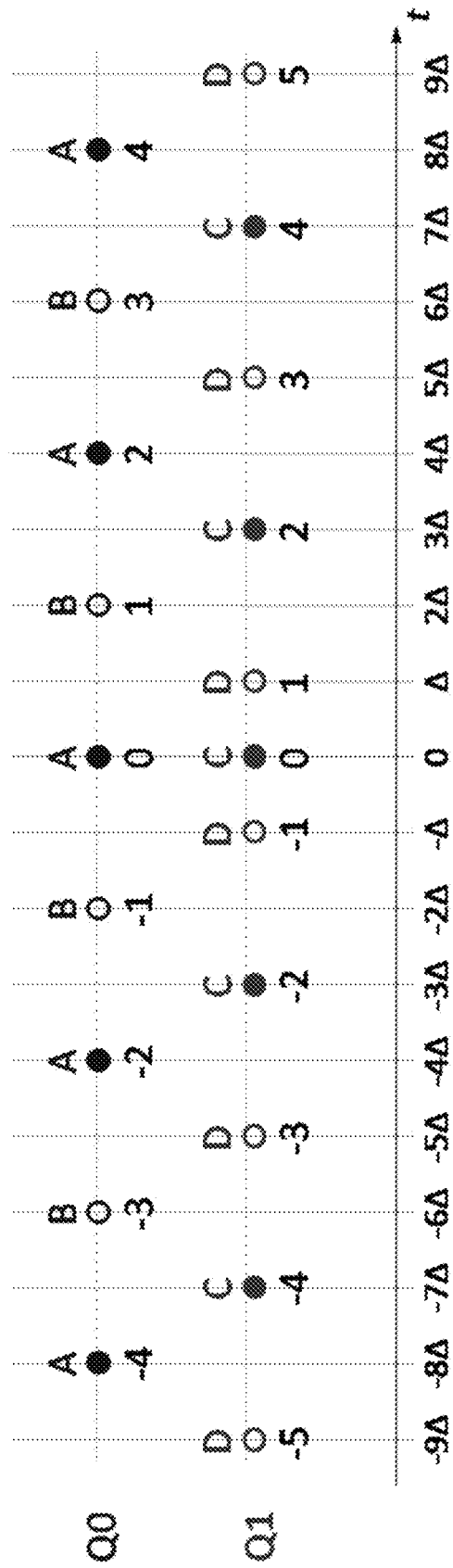
FIG. 19 shows examples of scalar quantizers.

The two scalar quantizers used, denoted by Q0 and Q1, are illustrated in FIG. 19. The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 20:
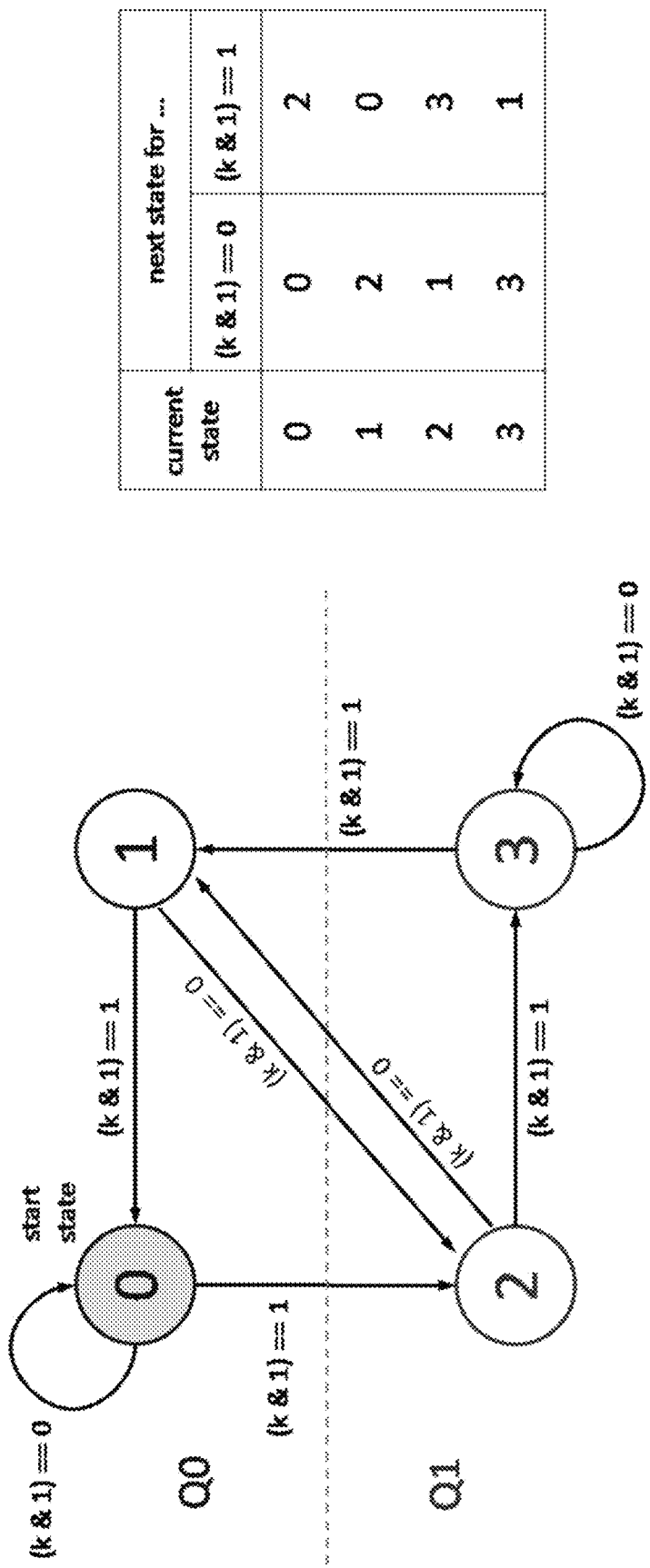
FIG. 20 shows an example of a state transition machine associated with scalar quantizers.

As illustrated in FIG. 20, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 20, where k denotes the value of the transform coefficient level.

2.4.1.3. Syntax and Semantics 7.3.7.11 Residual Coding Syntax

The portions below in bold, italics and/or underlines indicate proposed modifications to the standard.

|  | Descriptor |
|---|---|
| residual_coding( x0, y0, log2TbWidth, log2TbHeight, cIdx ) { | |
|   if( ( tu_mts_idx[ x0 ] [ y0 ] > 0 \|\| | |
|      ( cu_sbt_flag && log2TbWidth < 6 && log2TbHeight < 6 ) ) | |
|     && cIdx == 0 && log2TbWidth > 4 ) | |
|     log2TbWidth = 4 | |
|   else | |
|     log2TbWidth = Min( log2TbWidth, 5) | |
|   if( tu_mts_idx[ x0 ] [ y0 ] > 0 \|\| | |
|      ( cu_sbt_flag && log2TbWidth < 6 && log2TbHeight < 6 ) ) | |
|     && cIdx == 0 && log2TbHeight > 4) | |
|     log2TbHeight = 4 | |
|   else | |
|     log2TbHeight = Min( log2TbHeight, 5) | |
|   if( log2TbWidth > 0) | |
|     last_sig_coeff_x_prefix | ae(v) |
|   if( log2TbHeight > 0) | |
|     last_sig_coeff_y_prefix | ae(v) |
|   if( last_sig_coeff_x_prefix > 3) | |
|     last_sig_coeff_x_suffix | ae(v) |
|   if( last_sig_coeff_y_prefix > 3) | |
|     last_sig_coeff_y_suffix | ae(v) |
|   log2SbW = ( Min( log2TbWidth, log2TbHeight) < 2 ? 1 : 2) | |
|   log2SbH = log2SbW | |
|   if ( log2TbWidth < 2 && cIdx == 0 ) { | |
|     log2SbW = log2TbWidth | |
|     log2SbH = 4 − log2SbW | |
|   } else if ( log2TbHeight < 2 && cIdx == 0) { | |
|     log2SbH = log2TbHeight | |
|     log2SbW = 4 − log2SbH | |
|   } | |
|   numSbCoeff= 1 << ( log2SbW + log2SbH) | |
|   lastScanPos = numSbCoeff | |
|   lastSubBlock = ( 1 << ( | |
| log2TbWidth + log2TbHeight − ( log2 SbW + log2SbH ) ) ) − 1 | |
|   do { | |
|     if( lastScanPos == 0) { | |
|       lastScanPos = numSbCoeff | |
|       lastSubBlock−− | |
|     } | |
|     lastScanPos−− | |
|     xS = | |
| DiagScanOrder[ log2TbWidth − log2SbW ][ log2TbHeight − log2SbH ] | |
|       [ lastSubBlock ][ 0 ] | |
|     yS = | |
| DiagScanOrder[ log2TbWidth − log2SbW ][ log2TbHeight − log2SbH ] | |
|       [ lastSubBlock ][ 1 ] | |
|     xC = ( xS << log2SbW ) + | |
| DiagScanOrder[ log2SbW ][ log2SbH ] [ lastScanPos ][ 0 ] | |
|     yC = ( yS << log2SbH ) + | |
| DiagScanOrder[ log2SbW ][ log2SbH ][ lastScanPos ][ 1 ] | |
|   } while( ( xC != LastSignificantCoeffX) \|\| ( yC != LastSignificantCoeffY ) ) | |
|   QState = 0 | |
|   for( i = lastSubBlock; i >= 0; i−−) { | |

|  | Descriptor |
|---|---|
| ```
    startQStateSb = QState
    xS =
DiagScanOrder[ log2TbWidth − log2SbW ][ log2TbHeight − log2SbH ]
        [ lastSubBlock ][ 0 ]
    yS =
DiagScanOrder[ log2TbWidth − log2SbW ][ log2TbHeight − log2SbH ]
        [ lastSubBlock ][ 1 ]
    inferSbDcSigCoeffFlag = 0
    if( ( i < lastSubBlock ) && ( i > 0 ) ) {
        coded_sub_block_flag[ xS ][ yS ]
        inferSbDcSigCoeffFlag = 1
    }
    firstSigScanPosSb = numSbCoeff
    lastSigScanPosSb = −1
    remBinsPass1 = ( ( log2SbW + log2SbH ) < 4 ? 8 : 32 )
    firstPosMode0 = ( i = = lastSubBlock ? lastScanPos : numSbCoeff − 1
)
    firstPosMode1 = −1
    for( n = firstPosMode0; n >= 0 && remBinsPass1 >= 4; n−− ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( coded_sub_block_flag[ xS ][ yS ] && ( n > 0 | |
!inferSbDcSigCoeffFlag) &&
            ( xC != LastSignificantCoeffX | | yC != Last SignificantCoeffY ) )
{
            sig_coeff_flag[ xC ][ yC ]
            remBinsPass1−−
            if( sig_coeff_flag[ xC ][ yC ])
                inferSbDcSigCoeffFlag = 0
        }
        if( sig_coeff_flag[ xC ][ yC ]) {
            abs_level_gt1_flag[ n ]
            remBinsPass1−−
            if( abs_level_gt1_flag[ n ] ) {
                par_level_flag[ n ]
                remBinsPass1−−
                abs_level_gt3_flag[ n ]
                remBinsPass1−−
            }
            if( lastSigScanPosSb == −1)
                lastSigScanPosSb = n
            firstSigScanPosSb = n
        }
        AbsLevelPass1 [ xC ][ yC ] = sig_coeff_flag[ xC ][ yC ] +
par_level_flag[ n ] +
                abs_level_gt1 flag[ n ] +
2 * abs_level_gt3_flag[ n ]
        if( dep_quant_enabled_flag )
            QState = QStateTransTable[ QState ][ AbsLevelPass1 [ xC ][ yC ] &
1 ]
        if( remBinsPass1 < 4 )
            firstPosMode 1 = n − 1
    }
    for( n = num SbCoeff − 1; n >= firstPosMode1; n−−) {
        xC = ( xS << log2SbW ) +
DiagScanOrder[ log2SbW ] [ log2SbH ] [ n ] [ 0 ]
        yC = ( yS << log2SbH ) +
DiagScanOrder[ log2SbW ] [ log2SbH ] [ n ] [ 1 ]
        if( abs_level_gt3_flag[ n ] )
            abs_remainder[ n ]
        AbsLevel[ xC ][ yC ]= AbsLevelPass1[ xC ][ yC ]
+2 * abs_remainder[ n ]
    }
    for( n = firstPosMode0; n >= 0; n−−) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
``` | <br><br><br><br><br><br><br><br><br><br>ae(v)<br><br><br><br><br><br><br><br><br><br><br><br><br><br><br><br><br><br><br><br>ae(v)<br><br><br><br><br>ae(v)<br><br><br>ae(v)<br><br>ae(v)<br><br><br><br><br><br><br><br><br><br><br><br><br><br><br><br><br><br><br><br><br>ae(v) |

|  | Descriptor |
|---|---|
| dec_abs_level[ n ]<br>    if(AbsLevel[ xC ][ yC ] > 0 )<br>        firstSigScanPosSb = n<br>    if( dep_quant_enabled_flag)<br>        QState = QStateTransTable[ QState ][ AbsLevel[ xC ][ yC ] & 1 ]<br>  }<br>  if( dep_quant_enabled_flag | | !sign_data_hiding_enabled_flag )<br>    signHidden = 0<br>  else<br>    signHidden = ( lastSigScanPosSb − firstSigScanPosSb > 3 ? 1 : 0 )<br>  for( n = numSbCoeff − 1; n >= 0; n−− ) {<br>    xC = ( xS << log2SbW ) +<br>DiagScanOrder[ log2SbW ][ log2SbH ][ n ][ 0 ]<br>    yC = ( yS << log2SbH ) +<br>DiagScanOrder[ log2SbW ][ log2SbH ][ n ][ 1 ]<br>    if( ( AbsLevel[ xC ][ yC ] > 0 ) &&<br>      ( !signHidden | | ( n != firstSigScanPosSb ) ) )<br>      coeff_sign_flag[ n ] | ae(v)<br><br>ae(v) |
|   }<br>  if( dep_quant_enabled_flag ) {<br>    QState = startQStateSb<br>    for( n = numSbCoeff − 1; n >= 0; n−− ) {<br>      xC = ( xS << log2SbW ) +<br>DiagScanOrder[ log2SbW ][ log2SbH ][ n ][ 0 ]<br>      yC = ( yS << log2SbH ) +<br>DiagScanOrder[ log2SbW ][ log2SbH ][ n ][ 1 ]<br>      if( AbsLev el[ xC ][ yC ] >0 )<br>        TransCoeffLevel[ x0 ][ y0 ][ cIdx ][ xC ][ yC ] =<br>          ( 2 * AbsLevel[ xC ][ yC ] − ( QState > 1 ? 1 : 0 ) ) *<br>          ( 1 − 2 * coeff_sign_flag[ n ] )<br>      QState = QStateTransTable[ QState ] [ par_level_flag[ n ] ]<br>  } else {<br>    sumAbsLevel = 0<br>    for( n = numSbCoeff − 1; n >= 0; n−− ) {<br>      xC = ( xS << log2SbW ) +<br>DiagScanOrder[ log2SbW ][ log2SbH ][ n ][ 0 ]<br>      yC = ( yS <<log2SbH ) +<br>DiagScanOrder[ log2SbW ][ log2SbH ][ n ][ 1 ]<br>      if( AbsLevel[ xC ][ yC ] > 0) {<br>        TransCoeffLevel[ x0 ] [ y0 ] [ cIdx ] [ xC ] [ yC ] =<br>          AbsLevel[ xC ][ yC ]* ( 1 − 2 * coeff_sign_flag[ n ] )<br>        if( signHidden ) {<br>          sumAbsLevel += AbsLevel[ xC ][ yC ]<br>          if( ( n == firstSigScanPosSb ) && ( sumAbsLevel % 2) ==<br>1 ) )<br>            TransCoeffLevel[ x0 ][ y0 ][ cIdx ][ xC ][ yC ] =<br>              −TransCoeffLevel[ x0 ][ y0 ][ cIdx ][ xC ][ yC ]<br>        }<br>      }<br>    }<br>  }<br>}<br>} | |

2.4.2. Coefficients Coding of TS-Coded Blocks and QR-BDPCM Coded Blocks

QR-BDPCM follows the context modeling method for TS-coded blocks.

2.4.2.1. Coding Passes

A modified transform coefficient level coding for the TS residual. Multiple passes are applied to code each CG if it contains non-zero coefficients:

$1^{st}$ pass: code the greater than 0 flag (sig_coeff_flag), sign flag (coeff_sign_flag), greater than 1 (abs_level_gtx_flag[0]), and parity flag (par_level_flag), if needed $2^{nd}$-$5^{th}$ passes:

For the j-th pass, code the greater than (2*j) flag (abs_level_gtx_flag[j−1])

$6^{th}$ passes: code the remaining part of the magnitude of the coefficient (abs_remainder)

2.4.2.2. Summary of Changes Compared to Non-TS Residual Coding

Relative to the regular residual coding case, the residual coding for TS includes the following changes:
1) no signalling of the last x/y position
2) coded_sub_block_flag coded for every subblock except for the last subblock when all previous flags are equal to 0;
3) sig_coeff_flag context modelling with reduced template,
4) a single context model for abs_level_gtX_flag[0] and par_level_flag,
5) context modeling for the sign_flag, additional greater than 5, 7, 9 flags,
6) modified Rice parameter derivation for the remainder binarization
7) a limit for the number of context coded bins per sample, 2 bins per sample within one block.

2.4.2.3. Syntax and Semantics
7.3.6.10 Transform Unit Syntax

The portions below in bold, italics and/or underlines indicate proposed modifications to the standard.

|  | Descriptor |
|---|---|
| transform_unit( x0, y0, tbWidth, tbHeight, treeType, subTuIndex ) { <br> ... <br>   if( tu_cbf_luma[ x0 ][ y0 ] && treeType != DUAL_TREE_CHROMA <br>     && ( tbWidth <= 32) && ( tbHeight <= 32) <br>     && ( IntraSubPartitionsSplit[ x0 ][ y0 ] - - ISP_NO_SPLIT ) <br> && ( !cu_sbt_flag ) ) { <br>     if( transform_skip_enabled_flag && tbWidth <= MaxTsSize && tbHeight <= MaxTsSize ) <br>       transform_skip_flag[ x0 ][ y0 ] <br>     if( (( CuPredMode[ x0 ][ y0 ] != MODE_INTRA && sps_explicit_mts_inter_enabled flag ) <br>       \|\| ( CuPredMode[ x0 ][ y0 ] = = MODE_INTRA && sps_explicit_mts_intra_enabled_flag )) <br>     && ( tbWidth <= 32) && ( tbHeight <= 32 ) && ( !transform_skip_flag[ x0 ][ y0 ] ) ) <br>       tu_mts_idx[ x0 ][ y0 ] <br>   } <br>   if( tu_cbf_luma[ x0 ][ y0 ] ) { <br>     _if( !transform_skip_flag[ x0 ][ y0 ] )_ <br>       residual_coding( x0, y0, Log2( tbWidth ), Log2( tbHeight), 0 ) <br>     _else_ <br>       _residual_coding_ts( x0, y0, Log2( tbWidth ), Log2( tbHeight ), 0 )_ <br>   } <br>   if( tu_cbf_cb[ x0 ][ y0 ] ) <br>     residual_coding( xC, yC, Log2( wC ), Log2( hC ), 1 ) <br>   if( tu_cbf_cr[ x0 ][ y0 ] ) <br>     residual_coding( xC, yC, Log2( wC ), Log2( hC ), 2 ) <br> } | <br><br><br><br><br><br><br>ae(v)<br><br><br><br><br><br>ae(v) |

|  | Descriptor |
|---|---|
| residual_ts_coding( x0, y0, log2TbWidth, log2TbHeight, cIdx ) { <br>   log2SbSize = ( Min( log2TbWidth, log2TbHeight ) < 2 ? 1 : 2 ) <br>   numSbCoeff = 1 << ( log2Sb Size << 1 ) <br>   lastSubBlock = <br> ( 1 << ( log2TbWidth + log2TbHeight − 2 * log2Sb Size) ) − 1 <br>   /* Loop over subblocks from top-left (DC) subblock to the last one */ <br>   inferSbCbf = 1 <br>   MaxCcbs = 2 * ( 1 << log2TbWidth ) * ( 1<< log2TbHeight ) <br>   for( i = 0; i <= lastSubBlock; i++ ) { <br>     xS = DiagScanOrder[ log2TbWidth − log2 Sb Size ][ log2TbHeight − log2 Sb Size ][ i ][ 0 ] <br>     yS = DiagScanOrder[ log2TbWidth − log2 Sb Size ][ log2TbHeight − log2 Sb Size ][ i ][ 1 ] <br>     if( ( i != lastSubBlock \|\| !inferSbCbf) <br>       coded_sub_block_flag[ xS ][ yS ] <br>       MaxCcbs-- <br>     if( coded_sub_block_flag[ xS ][ yS ] && i < lastSubBlock ) <br>       inferSbCbf = 0 <br>   } <br>   /* First scan pass */ <br>   inferSbSigCoeffFlag = 1 <br>   for( n = ( i == 0; n <= numSbCoeff − 1; n++ ) { <br>     xC = ( xS << log2SbSize ) + DiagScanOrder[ log2SbSize ][ log2SbSize ][ n ][ 0 ] <br>     yC = ( yS << log2SbSize ) + DiagScanOrder[ log2SbSize ][ log2SbSize ][ n ][ 1 ] <br>     if( coded_sub_block_flag[ xS ][ yS ] && <br>       ( n == numSbCoeff− 1 \|\| !inferSbSigCoeffFlag ) ) { <br>       sig_coeff flag[ xC ][ yC ] <br>       MaxCcbs-- <br>       if( sig_coeff_flag[ xC ][ yC ] ) <br>         inferSbSigCoeffFlag = 0 <br>     } <br>     if( sig_coeff_flag[ xC ][ yC ]) { <br>       coeff_sign_flag[ n ] <br>       abs_level_gtx_flag[ n ][ 0 ] <br>       MaxCcbs = MaxCcbs − 2 | <br><br><br><br><br><br><br><br><br><br><br><br><br>ae(v)<br><br><br><br><br><br><br><br><br><br><br>ae(v)<br><br><br><br><br>ae(v)<br>ae(v) |

|  | Descriptor |
|---|---|
| ```
    if( abs_level_gtx_flag[ n ][ 0 ] ) {
      par_jevel_flag[ n ]
      MaxCcbs--
    }
  }
  AbsLevelPassX[ xC ][ yC ] =
    sig_coeff_flag[ xC ][ yC ]+ par_level_flag[ n ] +
abs_level_gtx_flag[ n ][ 0 ]
}
/* Greater than X scan passes (numGtXFlags= 5) */
for( i = 1; i <= 5 - 1 && abs_level_gtx_flag[ n ][ i - 1 ] ; i++ ) {
  for( n = 0; n <= numSbCoeff - 1; n++ ) {
    xC = ( xS << log2Sb Size ) +
DiagScanOrder[ log2SbSize ][ log2SbSize ][ n ][ 0 ]
    yC = ( yS << log2Sb Size ) +
DiagScanOrder[ log2SbSize ][ log2SbSize ][ n ][ 1 ]
      abs_level_gtx_flag[ n ][ i ]
      MaxCcbs--
      AbsLevelPassX[ xC ][ yC ] + = 2 * abs level gtx flag[ n ][ i ]
  }
}
/* remainder scan pass */
for( n = 0; n <= num Sb Coeff - 1; n++ ) {
  xC = ( xS << log2Sb Size ) +
DiagScanOrder[ log2SbSize ][ log2SbSize ][ n ][ 0 ]
  yC = ( yS << log2Sb Size ) +
DiagScanOrder[ log2SbSize ][ log2SbSize ][ n ][ 1 ]
    if( abs_level_gtx_flag[ n ][ numGtXFlags - 1 ] )
      abs_remainder[ n ]
    TransCoeffLevel[ x0 ][ y0 ][ cIdx ][ xC ][ yC ] = ( 1 - 2 *
coeff_sign_flag[ n ] ) *
        ( AbsLevelPassX[ xC ][ yC ] +
abs_remainder[ n ] )
  }
 }
}
``` | ae(v)<br><br><br><br><br><br><br><br><br><br><br><br>ae(v)<br><br><br><br><br><br><br><br><br><br><br><br>ae(v) |

The number of context coded bins is restricted to be no larger than 2 bins per sample for each CG.

TABLE 9

Assignment of ctxInc to syntax elements with context coded bins

| Syntax element | binIdx | | | | | |
|---|---|---|---|---|---|---|
|  | 0 | 1 | 2 | 3 | 4 | >= 5 |
| last_sig_coeff_x_prefix | 0..23 (clause 9.5 4.2.4) | | | | | |
| last_sig_coeff_y_prefix | 0..23 (clause 9.5.4.2.4) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | *(MaxCcbs > 0) ?* ( 0 . . 7 . (clause 9.5.4.2.6) ): *bypass* | na | na | na | na | na |
| sig_coeff_flag[ ][ ] | *(MaxCcbs > 0) ?* ( 0 . . . 93 (clause 9.5.4.2.8) ): *bypass* | na | na | na | na | na |
| par_level_flag[ ] | *(MaxCcbs > 0) ?* ( 0 . . . 33 (clause 9.5.4.2.9) ): *bypass* | na | na | na | na | na |
| abs_level_gtx_flag[ ][ i ] | 0 . . . 70 (clause 9.5.4.2.9) | na | na | na | na | na |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] | bypass | na | na | na | na | na |
| *transform_skip_flag[ x0 ][ y0 ] == 0 coeff_sign_flag[ ] transform_skip_flag[ x0 ][ y0 ] == 1* | *0* | *na* | *na* | *na* | *na* | *na* |

3. Drawbacks of Existing Implementations

The current design has the following problems:
1. To meet the throughput of Context-adaptive binary arithmetic coding (CABAC), the maximum number context coded bins per block is set and a counter is used to record how many context coded bins are included within one block. In current design, denote a luma block size by W*H, a counter is used to record how many bins have been coded. Once the counter reaches K*W*H (K=2 in current VVC, equal to MaxCcbs which is 2*(1<<log 2TbWidth)*(1<<log 2TbHeight) in the latest VVC working draft), the remaining bins are all bypass coded. However, the same setting of maximum number context coded bins per block still results in severe problems in terms of throughput of CABAC context coded bins.
2. If transform skip mode (including QR-BDPCM) is also applied to chroma blocks, how to set the maximum number of context coded bins is unknown.
3. Several ways to further increase the throughput of CABAC context coded bins have been described in PCT/CN2019/086814, which is incorporated by reference herein its entirety.

4. Example Techniques and Embodiments

The detailed embodiments described below should be considered as examples to explain general concepts. These embodiments should not be interpreted narrowly way. Furthermore, these embodiments can be combined in any manner.

In the following discussion, a CU may comprise information associated to all the three-color components with the single tree coding structure. Or a CU may comprise information only associated to the luma color component with the mono-color coding. Or a CU may comprise information only associated to the luma color component (e.g., Y component in YCbCr format or G component in GBR format) with the dual tree coding structure. Or a CU may comprise information only associated to the two chroma components (e.g., Cb and Cr components in YCbCr format or B and R components in GBR format) with the dual-tree coding structure.

In the following description, a "block" may refer to coding unit (CU) or a transform unit (TU) or coding block (CB) or transform block (TB).

In addition to the controlling of maximum number of context coded bins per block, it is proposed that the maximum number of context coded bins may be restricted per X. X being a video unit (brick/tile/CTU row/one or multiple CTUs or a VPDU or sub-region of video data)/block (TU/CU/PU/TB/CB etc. al)/CG/sub-region within a block/coding pass/syntax element/group of syntax elements/sample/pixel/a context/group of contexts. When there is a restriction per X (e.g., coding pass, block), a counter is assigned to record how many bins have been context coded for each X (e.g., coding pass, block).
1. For chroma components, the maximum number of context coded bins may be smaller or no greater than that for a luma component.
   a. In one example, the maximum number of context coded bins of two chroma components may be both smaller or no greater than that for a luma component.
   b. In one example, the maximum number of context coded bins of one chroma component may be smaller or no greater than that for a luma component.
2. For an intra-coded video unit (e.g., slice/tile/brick/picture), the maximum number of context coded bins may be greater or no smaller than that for an inter-coded video unit (e.g., PB slice/tile/brick/picture).
3. Given the block width and height to be W and H, instead of always using K (K=2)*W*H as the maximum number of context coded bins for all blocks, the maximum number of context coded bins per block and/or K may depend on the coding characteristic of that block, respectively.
   a. In one example, K may be changed from one block to another block.
   b. In one example, K may be dependent on W and/or H.
      i. In one example, for two blocks, the value of K for one with larger block size is no greater than or smaller than that for the other with smaller block size.
      ii. In one example, the maximum number of context coded bins and/or K may depend on the block shape (e.g. square (W=H), or non-square (W!=H)).
      iii. In one example, for W*H>T0, K=1.75 (e.g., T0=64)
   c. In one example, the maximum number of context coded bins and/or K may depend on the coded mode, such as intra/inter/IBC.
   d. In one example, the maximum number of context coded bins and/or K may depend on the transform matrix type that is applied.
   e. In one example, the maximum number of context coded bins and/or K may depend on the coding technologies, such as whether transform is applied or not.
   f. In one example, the maximum number of context coded bins and/or K may depend on the coding technologies, such as whether QR-BDPCM is enabled or not.
      i. In one example, for W*H=T0 and QR-BDPCM is applied, K=1.75 (e.g., T0=64)
      ii. In one example, for W*H<=T0 && W*H>=T1 and QR-BDPCM is applied, K=1.75 (e.g., T0=64, T1=32)
   g. In one example, the maximum number of context coded bins and/or K may depend on the location of one block, e.g., in picture/slice/brick/tile boundary.
   h. In one example, the maximum number of context coded bins and/or K may depend on the quantization parameters.
   i. The maximum number of context coded bins and/or K may depend on where the prediction signal is generated from, spatial neighbors, samples in current picture, samples in one or multiple pictures different from current picture.
   j. In one example, the maximum number of context coded bins and/or K may depend on the block partitioning depth and/or partitioning structure.
   k. In one example, the maximum number of context coded bins per block may depend on whether lossless coding mode is applied.
4. The maximum number of context coded bins per sample for a block may depend on the coding characteristic of that block.
   a. In one example, for two blocks, the maximum number of context coded bins per sample for one bock with larger size is no greater than or smaller than that for the other with smaller block size.

b. In one example, the maximum number of context coded bins per sample for a block may depend on the block shape (square, or non-square).
c. In one example, the maximum number of context coded bins per sample for a block may depend on the coded mode, such as intra/inter/IBC.
d. In one example, the maximum number of context coded bins per sample for a block may depend on the transform matrix type that is applied.
e. In one example, the maximum number of context coded bins per sample for a block may depend on the coding technologies, such as whether transform is applied or not
f. In one example, the maximum number of context coded bins per sample for a block may depend on the coding technologies, such as whether QR-BDPCM is enabled or not.
g. In one example, the maximum number of context coded bins per sample for a block may depend on the location of one block, e.g., in picture/slice/brick/tile boundary.
h. In one example, the maximum number of context coded bins per sample for a block may depend on the quantization parameters.
i. In one example, the maximum number of context coded bins per sample for a block may depend on where the prediction signal is generated from, spatial neighbors, samples in current picture, samples in one or multiple pictures different from current picture.
j. In one example, the maximum number of context coded bins per sample may depend on the block partitioning depth and/or partitioning structure.
k. In one example, the maximum number of context coded bins per sample may depend on whether lossless coding mode is applied.

5. Syntax elements (e.g., context coded syntax elements for residual coding) may be divided into different groups, with separate control.
   a. In one example, different control strategies applied may be applied to different groups.
   b. In one example, context coded syntax elements may be classified into N groups. Each group has its threshold to control if context coded method can be applied.
      i. In one example, for group i, a counter $C_i$ may be maintained to control how many bins can be coded with CABAC methods. When the number of context coded bins is larger than a threshold, context coded methods may be disallowed.
      ii. The threshold may depend on the initial context/probability of syntax elements in a group.
         1) Alternatively, the threshold may be signaled at SPS/PPS/Slice/Picture/Tile group level.
   c. How to group syntax elements may depend on the initial context/probability of a syntax element.
   d. How to group syntax elements may depend on where the syntax element is coded, such as in partitioning level, in CU or PU or TU level or residual coding level.
   e. The grouping may be changed dynamically.
      i. In one example, when the context for a syntax element is updated to within a predefined context set, the syntax element may be assigned to a certain group.
      ii. In one example, regrouping may be allowed based on the context/probability of each syntax element.
         1) In one example, regrouping may be allowed when a number of samples have been coded since the last regrouping.
         2) In one example, regrouping may be allowed when a given number of bits have been generated to the bitstream since the last regrouping.
         3) In one example, regrouping may be allowed when a given number of CG have been processed since the last regrouping.
         4) In one example, regrouping may be allowed when the probability difference in a group exceeds a certain threshold.
         5) In one example, regrouping may be allowed when the number of context coded bin exceeds a certain threshold.
         6) In one example, regrouping may be allowed when context/probability is re-initialized.

6. Contexts (e.g., those used for residual coding) may be divided into different groups, with separate control.
   a. In one example, different control strategies applied to different groups.
   b. In one example, contexts may be classified into N groups. Each group has its threshold to control if context coded method can be applied.
      i. In one example, for context group i, a counter $C_i$ may be maintained to control how many bins can be coded with the contexts in the group. When the number of context coded bins is larger than a threshold, context coded methods with contexts in the group may be disallowed
      ii. The threshold may depend on the initial state/probability of contexts in a group.
         1) Alternatively, the threshold may be signaled at SPS/PPS/Slice/Picture/Tile group level.
   c. How to group contexts may depend on the initial state/probability of a context.
   d. The grouping may be changed dynamically.
      i. In one example, when the state for a context is updated to within a predefined state set, the context may be assigned to a certain group.
      ii. In one example, regrouping may be allowed based on the state/probability of each context.
         1) In one example, regrouping may be allowed when a number of samples have been coded since the last regrouping.
         2) In one example, regrouping may be allowed when a given number of bits have been generated to the bitstream since the last regrouping.
         3) In one example, regrouping may be allowed when a given number of CG have been processed since the last regrouping.
         4) In one example, regrouping may be allowed when the context probability difference in a group exceeds a certain threshold.
         5) In one example, regrouping may be allowed when the number of context coded bin exceeds a certain threshold.
         6) In one example, regrouping may be allowed when state/probability is re-initialized.

7. Counters/thresholds (e.g., K*W*H) to control number of context coded bin may be reset in a predefined way
   a. In one example, the counter may be reset when a given number of samples have been coded since the last counter reset.
   b. In one example, the counter may be reset when a given number of bits have been generated to the bitstream since the last counter reset.

c. In one example, the counter may be reset when a given number of CG have been processed since the last counter reset.
d. In one example, the counter may be reset at each CTU row.
e. In one example, the counter may be reset at each tile group.
f. In one example, the counter may be reset at each tile.
g. In one example, the counter may be reset at each CTU.
h. In one example, the counter may be reset when receiving a certain flag.
   i. In one example, the flag may be sent periodically to tell if the counter should be reset or not.
   ii. In one example, the flag may be signaled at PPS/SPS/Picture/Tile group/Slice/CTU rows/CTU/CU/Block/Video brick level.

8. The above methods may be applicable to the maximum number of context coded bins per X (e.g., X being a video unit (brick/tile/CTU row/one or multiple CTUs or a VPDU/CG/coding pass/syntax element/group of syntax elements/pixel).
   a. In one example, X being a CG or coding pass or syntax element or a group of syntax element.
      i. Alternatively, the maximum number of context coded bins per CG may depend on the location of one CG within one block.
   b. The above methods may be applicable to the maximum number of context coded bins per tile group/per tile/per CTU or per CTU row.
   c. The above methods may be applicable to the maximum number of context coded bins per VPDU.
   d. The maximum number of context coded bins per picture/slice per tile group/per the/CTU row/CTU/VPDU/block/sample may be different for different profiles/levels/tiers of a video coding standard.

9. When one CU has multiple TUs, the maximum number of context coded bins may be controlled per CU.
   a. In one example, a counter is assigned for a CU to record how many context coded bins within the current CU. It may be reset to 0 before encoding/decoding a CU.
   b. Alternatively, the maximum number of context coded bins may be controlled per TU.
      i. Alternatively, furthermore, a counter is assigned for a TU to record how many context coded bins within the current TU. It may be reset to 0 before encoding/decoding a TU.
   c. Whether to control context coded bins in CU or TU level may be determined by certain rules, such as based on the dimension of the CU.

10. When one CU/TU/PU has multiple color components (e.g., 3 color components in single tree; 2 color components in dual tree chroma coding), the maximum number of context coded bins may be controlled per color component.
    a. In one example, a counter is assigned for a block in the CU/TU/PU (e.g., luma block) to record how many context coded bins within the current block. It may be reset to 0 before encoding/decoding a block. That is, different color component has separate control.
    b. Alternatively, the maximum number of context coded bins may be controlled per CU/TU/PU.
       i. Alternatively, furthermore, a counter is assigned for a CU/TU/PU to record how many context coded bins within the current CU/TU/PU. It may be reset to 0 before encoding/decoding a CU/TU/PU.
    c. Whether to control context coded bins in one or multiple color components may be determined by certain rules, such as partitioning structure (dual or single tree), such as whether transform is applied to a color component or not.

11. The maximum number of context coded bins per X (e.g., X being a picture/slice/CTU row/CTU/VPDU/block/sample/a group of syntax elements/TB/TU/sub-block/CG) may be set to the same values for different coding methods.
    a. In one example, handling of TS or not-TS coded video blocks may follow the same rules (e.g., same threshold which controls number of context coded bins) to determine whether the remaining bins are context coded or bypass coded.
    b. In one example, the area of a video block (e.g., transform block in TB) is used to derive the maximum number of context-coded bins for a TB. For a TB, the maximum number of context-coded bins is equal to tb_width*tb_height*K (e.g, K=1.75) wherein, for example, the tb_width and tb_height are the width and height of a TB after coefficient zero-out. The threshold K may be applied to all kinds of video blocks regardless it is TS or non-TS mode.
       i. Alternatively, furthermore, a counter may be set to tb_width*tb_height*K before encoding/decoding a video block. It may be decreased by 1 after decoding one context coded bin. When the number of context coded bins is smaller than a second threshold after decoding a syntax element or a sub-block, all the remaining bins or all are bypass coded.
          1) In one example, the second threshold may depend on the coding method applied to one video block (e.g., TS or non-TS).
             a. For example, K0 (e.g., 4) for non-TS coded block, and K1 (e.g., 8) for TS coded blocks. K0 and/K1 may depend on the coding passes/sub-blocks/CGs in encoding/decoding the video block.
          2) In one example, the second threshold may depend on the coding method applied to one video block (e.g., TS or non-TS).
             a. For example, the syntax element may be the 'abs_level_gt3_flag' in non-TS coded block
             b. For example, the syntax element may be the 'par_level_flag' in non-TS coded block 12. The maximum number of context coded bins per X (e.g., X being a picture/slice/CTU row/CTU/VPDU/block/sample/a group of syntax elements) may be signaled, such as in VPS/SPS/DPS/PPS/APS/picture header/slice header/tile group header.

5. Example Implementations of the Disclosed Technology

Figure 21:
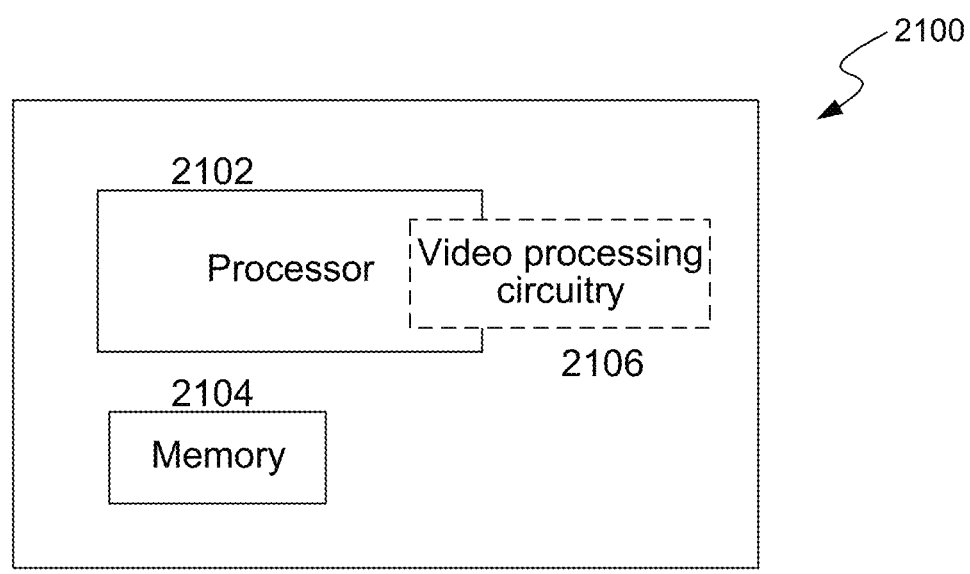
FIG. 21 is a block diagram of an example of a hardware platform for implementing a visual media decoding or a visual media encoding technique described in the present document.

FIG. 21 is a block diagram of a video processing apparatus 2100. The apparatus 2100 may be used to implement one or more of the methods described herein. The apparatus 2100 may be embodied in a smartphone, tablet, computer, Internet of Things (IoT) receiver, and so on. The apparatus 2100 may include one or more processors 2102, one or more memories 2104 and video processing hardware 2106. The processor(s) 2102 may be configured to implement one or more methods described in the present document. The memory (memories) 2104 may be used for storing data and code used for implementing the methods and techniques described herein. The video processing hardware 2106 may be used to implement, in hardware circuitry, some techniques described in the present document, and may be partly or completely be a part of the processors 2102 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 22:
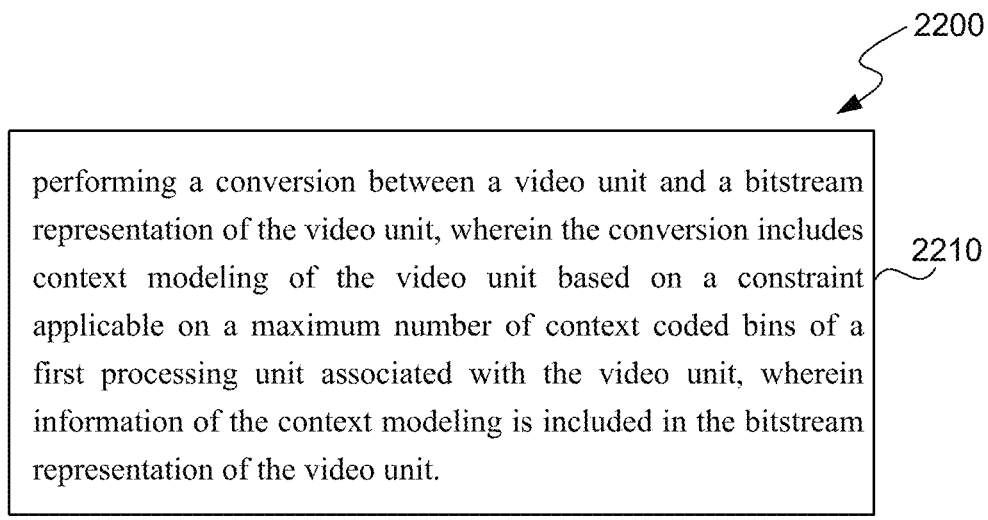
FIG. 22 shows a flowchart of an example method for video coding.

FIG. 22 is a flowchart for an example method 2200 of visual media processing. The method 2200 includes, at 2210, performing a conversion between a video unit and a bitstream representation of the video unit, wherein the conversion includes context modeling of the video unit based on a constraint applicable on a maximum number of context coded bins of a first processing unit associated with the video unit, wherein information of the context modeling is included in the bitstream representation of the video unit.

Some embodiments may be described using the following clause-based format.

1. A method of visual media processing, comprising:
performing a conversion between a video unit and a bitstream representation of the video unit, wherein the conversion includes context modeling of the video unit based on a constraint applicable on a maximum number of context coded bins of a first processing unit associated with the video unit, wherein information of the context modeling is included in the bitstream representation of the video unit.

2. The method of clause 1, wherein the first processing unit includes one or more chroma components and a luma component, and a maximum number of context coded bins for each of the one or more chroma components is not greater than a maximum number of context coded bins for the luma component.

3. The method of clause 1, wherein the first processing unit includes an intra-coded video unit and an inter-coded video unit, and a maximum number of context coded bins of the intra-coded video unit is not greater than a maximum number of context coded bins of the inter-coded video unit.

4. The method of clause 1, wherein the maximum number of context coded bins of the first processing unit are related to dimensions of the video unit.

5. The method of clause 1, wherein the maximum number of context coded bins of the first processing unit are related to usage of QR-BDPCM coding step, a TS coding step, or a transform matrix type in the video unit.

6. The method of clause 1, wherein the maximum number of context coded bins of the first processing unit are related to one or more quantization parameters associated with the video unit.

7. The method of clause 1, wherein the maximum number of context coded bins of the first processing unit are related to a spatial location of the video unit.

8. The method of clause 1, wherein the maximum number of context coded bins of the first processing unit are related to a prediction signal.

9. The method of clause 9, wherein the prediction signal is generated from any one or more of: one or more spatially neighboring video units of the video unit, samples included in the video unit, or one or more samples from other video units.

10. The method of clause 1, wherein the maximum number of context coded bins of the first processing unit are related to a block partitioning depth and/or a partitioning structure of the video unit.

11. The method of clause 1, wherein the first processing unit includes two blocks and a maximum number of context coded bins per sample for a block with a larger block size is not greater than a maximum number of context coded bins per sample for the block with a smaller block size.

12. The method of clause 1, wherein the maximum number of context coded bins of the first processing unit are related to a shape of the video unit.

13. A method of visual media processing, comprising:
performing a conversion between a video unit and a bitstream representation of the video unit, wherein the conversion includes context modeling of the video unit based on a constraint applicable on a maximum number of context coded bins of a first processing unit associated with the video unit, wherein the conversion includes a step of grouping of processing units in accordance with contexts such that the first processing unit is associated with a first context and a second processing unit is associated with a second context.

14. The method of clause 13, wherein the first processing unit is associated with a threshold for selectively enabling or disabling context modeling.

15. The method of clause 14, wherein if the maximum number of context coded bins of the first processing unit exceeds the threshold, disabling context modeling for the video unit.

16. The method of clause 14, wherein the threshold for selectively enabling or disabling context modeling depend on the initial state/probability of the first context in the first processing unit.

17. The method of clause 14, wherein the threshold for selectively enabling or disabling context modeling is signaled as part of the bitstream representation.

18. The method of clause 14, wherein the grouping of processing units in accordance with contexts is dynamically alterable.

19. The method of clause 18, wherein regrouping of processing units in accordance with contexts is enabled or disabled based on one or more conditions.

20. The method of clause 19, wherein the one or more conditions include one or more of (a) a state/probability of each context, (b) a number of samples coded since a last regrouping (c) a number of bits generated in the coversion since a last regrouping, (d) a number of coding groups processed since a last regrouping, (e) a context probability difference in a group exceeding a threshold, (f) a number of context coded bins in a group exceeding a threshold, or (g) a re-initialization of a state/probability of a context.

21. A method of visual media processing, comprising:
performing a conversion between a video unit and a bitstream representation of the video unit, wherein the conversion includes context modeling of the video unit based on a constraint applicable on a maximum number of context coded bins of a first processing unit associated with the video unit, wherein a counter is used to record a number of context coded bins of the first processing unit, and wherein the counter is resettable when one or more conditions are met.

22. The method of clause 21, wherein the one or more conditions are predefined conditions.

23. The method of clause 21, wherein the one or more conditions are related to a number of samples coded since a last reset of the counter.

24. The method of clause 21, wherein the one or more conditions are related to a number of bits generated as part of the bitstream representation since a last reset of the counter.

25. The method of clause 21, wherein the one or more conditions are related to a number of coding groups processed since a last reset of the counter.

26. The method of clause 21, wherein the counter is reset at each row of a coding tree unit (CTU) of the video unit, at each tile, at each tile group, or upon detecting a flag in the bitstream representation.

27. The method of clause 26, wherein the flag indicates whether the counter is to be reset.

28. The method of any one or more of clauses 1-27, wherein the maximum number of context coded bins for the first processing unit depends on a color component of the video unit.

29. The method of any one or more of clauses 1-28, wherein the first processing unit includes a coding group, a coding pass, a syntax element, or a group of syntax elements.

30. The method of any one or more of clauses 1-29, wherein the maximum number of context coded bins of the first processing unit depends on a location of the video unit.

31. The method of any one or more of clauses 1-30, wherein the maximum number of context coded bins of the first processing unit depends on a slice/tile/tile group/picture type associated with the video unit.

32. The method of any one or more of clauses 1-31, wherein the maximum number of context coded bins of the first processing unit depends on a DPS/SPS/PPS/APS/VPS/sequence header/picture header/slice header/tile group header/tile/group of coding tree units (CTUs).

33. An apparatus in a video system comprising a processor and a non-transitory memory with instructions thereon, wherein the instructions upon execution by the processor, cause the processor to implement the method in any one of clauses 1 to 32.

34. A computer program product stored on a non-transitory computer readable media, the computer program product including program code for carrying out the method in any one of clauses 1 to 32.

Figure 23:
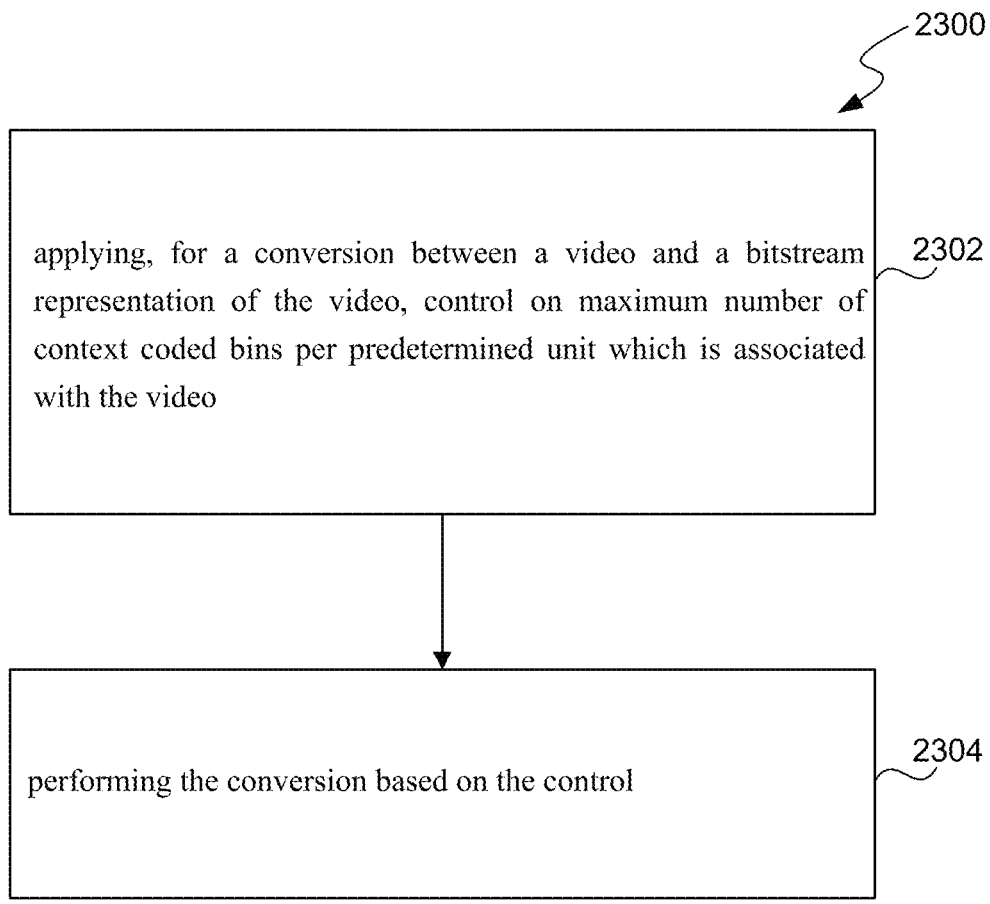
FIG. 23 shows a flowchart of an example method for video coding.

FIG. 23 is a flowchart for an example method 2300 of visual media processing. The method 2300 includes, at 2302, applying, for a conversion between a video and a bitstream representation of the video, control on maximum number of context coded bins per predetermined unit which is associated with the video; and at 2304, performing the conversion based on the control.

In some examples, the predetermined unit includes at least one of the following:
a block including at least one of a coding unit (CU), a transform unit (TU), prediction unit (PU), a coding block (CB) and transform block (TB);
a video unit including at least one of a brick, a tile, a coding tree unit (CTU) row, one or multiple CTU rows, a Virtual pipeline data unit (VPDUs) and sub-region of video data;
coding group (CG);
sub-region within a block;
coding pass;
syntax element or group of syntax elements;
sample, or pixel;
picture, slice, tile group or tile;
a context or group of contexts; and
color components including chroma components and a luma component.

In some examples, for chroma components, the maximum number of context coded bins is smaller or no greater than that for a luma component.

In some examples, the maximum numbers of context coded bins of two chroma components are both smaller or no greater than that for a luma component.

In some examples, the maximum number of context coded bins of one chroma component is smaller or no greater than that for a luma component.

In some examples, for an intra-coded video unit, the maximum number of context coded bins is greater or no smaller than that for an inter-coded video unit.

In some examples, when the predetermined unit includes a block which have block size of a width W and a height H, the maximum number of context coded bins for the block is K*W*H, K being a variable, wherein the maximum number of context coded bins per block and/or K depend on the coding characteristic of the block, respectively.

In some examples, K changes from one block to another block.

In some examples, K is dependent on W and/or H.

In some examples, for two blocks, the value of K for one with larger block size is no greater than or smaller than that for the other with smaller block size.

In some examples, the maximum number of context coded bins per block and/or K depend on the block shape of the block, wherein the block shape include one of a square shape with W=H and a non-square shape with W!=H.

In some examples, when W*H>T0, K=1.75, wherein T0 is an integer.

In some examples, T0=64.

In some examples, the maximum number of context coded bins per block and/or K depend on coded mode of the block, wherein the coded mode includes at least one of intra mode, inter mode and intra block copy (IBC) mode.

In some examples, the maximum number of context coded bins per block and/or K depend on transform matrix type that is applied.

In some examples, the maximum number of context coded bins per block and/or K depend on coding technologies of the block, wherein the coding technologies include whether transform is applied or not.

In some examples, the maximum number of context coded bins per block and/or K depend on coding technologies of the block, wherein the coding technologies include whether quantized residual domain domain block differential pulse-code modulation (QR-BDPCM) is applied or not.

In some examples, when W*H=T0 and QR-BDPCM is applied, K=1.75, wherein T0 is an integer.

In some examples, T0=64.

In some examples, when W*H<=T0 && W*H>=T1 and QR-BDPCM is applied, K=1.75, wherein T0 and T1 are integers.

In some examples, T0=64, and T1=32.

In some examples, the maximum number of context coded bins per block and/or K depend on the location of the block.

In some examples, the maximum number of context coded bins per block and/or K depend on quantization parameters of the block.

In some examples, the maximum number of context coded bins per block and/or K depend on sources where prediction signal is generated from, where the sources include at least one of spatial neighbors, samples in current picture, samples in one or multiple pictures different from current picture.

In some examples, the maximum number of context coded bins per block and/or K depend on block partitioning depth and/or partitioning structure of the block.

In some examples, the maximum number of context coded bins per block depend on whether lossless coding mode is applied.

In some examples, when the predetermined unit includes sample, the maximum number of context coded bins per sample for a block depend on the coding characteristic of the block.

In some examples, for two blocks, the maximum number of context coded bins per sample for one bock with larger size is no greater than or smaller than that for the other with smaller block size.

In some examples, the maximum number of context coded bins per sample for a block depend on the block shape of the block, wherein the block shape include one of a square shape a non-square shape.

In some examples, the maximum number of context coded bins per sample for a block depend on coded mode of the block, wherein the coded mode includes at least one of intra mode, inter mode and intra block copy (IBC) mode.

In some examples, the maximum number of context coded bins per sample for a block depend on transform matrix type that is applied.

In some examples, the maximum number of context coded bins per sample for a block depend on coding technologies of the block, wherein the coding technologies include whether transform is applied or not.

In some examples, the maximum number of context coded bins per sample for a block depend on coding technologies of the block, wherein the coding technologies include whether quantized residual domain block differential pulse-code modulation (QR-BDPCM) is applied or not.

In some examples, the maximum number of context coded bins per sample for a block depend on the location of the block.

In some examples, the maximum number of context coded bins per sample for a block depend on quantization parameters of the block.

In some examples, the maximum number of context coded bins per sample for a block depend on sources where prediction signal is generated from, where the sources include at least one of spatial neighbors, samples in current picture, samples in one or multiple pictures different from current picture.

In some examples, the maximum number of context coded bins per sample for a block depend on block partitioning depth and/or partitioning structure of the block.

In some examples, the maximum number of context coded bins per sample for a block depend on whether lossless coding mode is applied.

In some examples, the predetermined unit includes at least one of a CG, coding pass or syntax element or a group of syntax element.

In some examples, the maximum number of context coded bins per CG depends on the location of one CG within one block.

In some examples, the predetermined unit includes at least one of tile group, tile, CTU or CTU row.

In some examples, the predetermined unit includes VPDU.

In some examples, the maximum number of context coded bins per picture, per slice, per tile group, per tile, per CTU row, per CTU, per VPDU, per block or per sample is different for different profiles, levels or tiers of a video coding standard.

In some examples, the predetermined unit includes CU, and one CU includes multiple TUs.

In some examples, the maximum number of context coded bins is controlled per CU.

In some examples, a counter is assigned for a CU to record the number of context coded bins within the current CU.

In some examples, the counter is reset to 0 before encoding or decoding the CU.

In some examples, the maximum number of context coded bins is controlled per TU.

In some examples, a counter is assigned for a TU to record the number of context coded bins within the current TU.

In some examples, the counter is reset to 0 before encoding or decoding the TU.

In some examples, whether to control context coded bins in CU or TU level is determined by certain rules including the dimension of the CU.

In some examples, the predetermined unit includes one of CU, TU or PU, and one CU, TU or PU includes multiple color components, wherein the multiple color components include three color components in single tree or two color components in dual tree chroma coding.

In some examples, the maximum number of context coded bins is controlled per color component.

In some examples, a counter is assigned for a block in the CU, TU or PU to record the number of context coded bins within the current block.

In some examples, the counter is reset to 0 before encoding or decoding the block.

In some examples, the maximum number of context coded bins is controlled per CU, TU or PU.

In some examples, a counter is assigned for a block in the CU, TU or PU to record the number of context coded bins within the current CU, TU or PU.

In some examples, the counter is reset to 0 before encoding or decoding the CU, TU or PU.

In some examples, whether to control context coded bins in one or multiple color components is determined by certain rules, wherein the certain rules includes partitioning structure of dual or single tree and/or whether transform is applied to a color component or not.

In some examples, the maximum number of context coded bins per predetermined unit is set to the same values for different coding methods.

In some examples, transform skip (TS) or not-TS coded video blocks follows the same rules to determine whether the remaining bins are context coded or bypass coded, wherein the rules include using same threshold which controls number of context coded bins.

In some examples, the area of a video block in TB is used to derive the maximum number of context-coded bins for a TB.

In some examples, the maximum number of context-coded bins for a TB is equal to tb_width*tb_height*K, wherein, the tb_width and tb_height are the width and height of a TB after coefficient zero-out, and K is a threshold.

In some examples, the threshold K is applied to all kinds of video blocks regardless it is TS or non-TS mode.

In some examples, a counter is set to tb_width*tb_height*K before encoding or decoding the video block.

In some examples, the counter is decreased by 1 after decoding one context coded bin.

In some examples, when the number of context coded bins is smaller than a second threshold after decoding a syntax element or a sub-block, all the remaining bins or all are bypass coded.

In some examples, the second threshold depend on coding method applied to the video block, wherein the coding method includes TS or non-TS mode.

In some examples, the second threshold is K0 for non-TS coded block, and K1 for TS coded blocks, wherein K0 and K1 are integers.

In some examples, K0=4, and K1=8.

In some examples, K0 and/or K1 depend on at least one of coding passes, sub-blocks, or CGs in encoding or decoding the video block.

In some examples, the syntax element is abs_level_gt3_flag in non-TS coded block.

In some examples, the syntax element is par_level_flag in non-TS coded block.

In some examples, the maximum number of context coded bins per predetermined unit is signaled in at least one of VPS, SPS, DPS, PPS, APS, picture header, slice header or tile group header.

Figure 24:
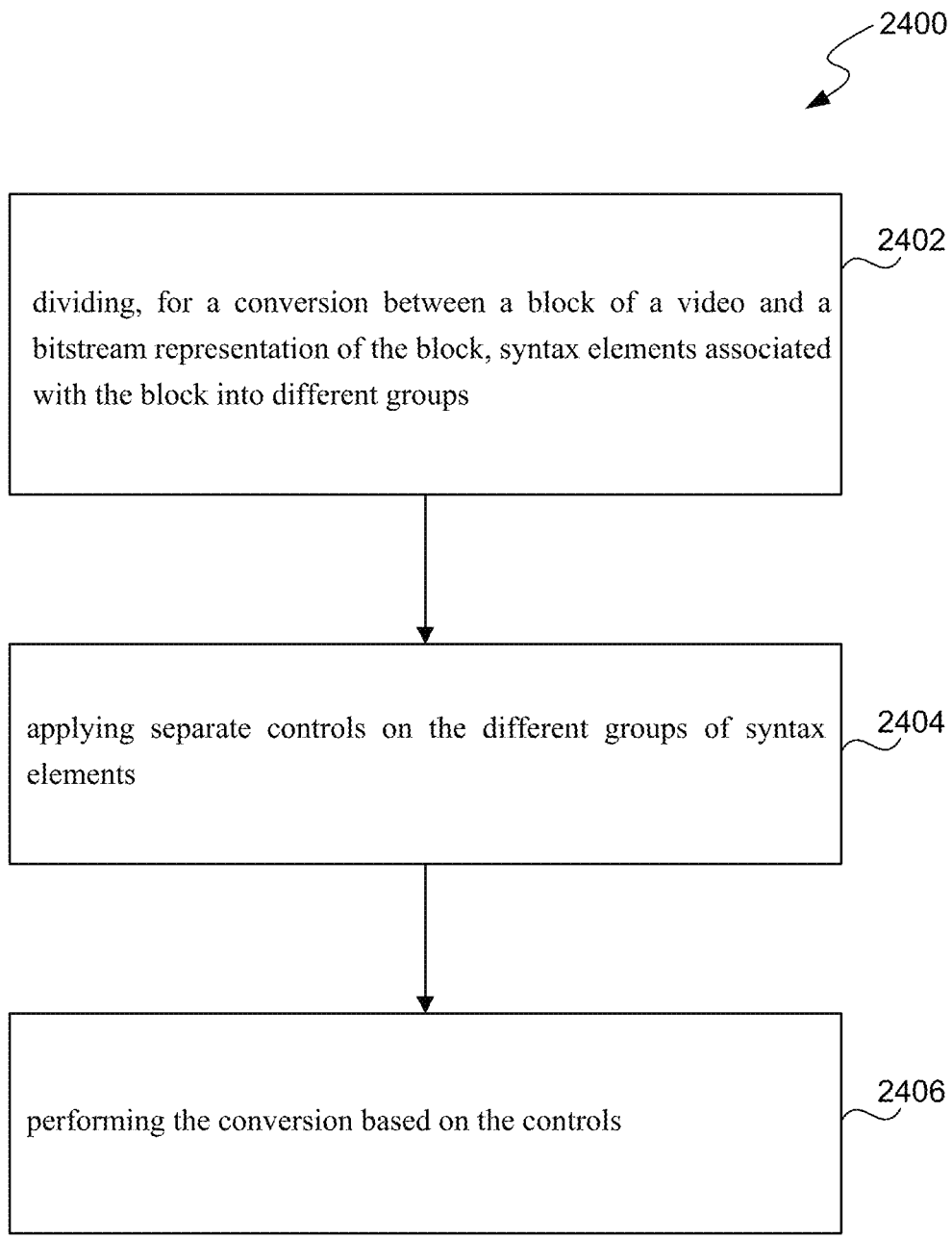
FIG. 24 shows a flowchart of an example method for video coding.

FIG. 24 is a flowchart for an example method 2400 of visual media processing. The method 2400 includes, at 2402, dividing, for a conversion between a block of a video and a bitstream representation of the block, syntax elements associated with the block into different groups; at 2404, applying separate controls on the different groups of syntax elements; and at 2406, performing the conversion based on the controls.

In some examples, different control strategies are applied to the different groups.

In some examples, the syntax elements include context coded syntax elements for residual coding, and the context coded syntax elements are classified into N groups, wherein each group has a threshold to control whether context coded method can be applied, N being an integer.

In some examples, for one group of the N groups, a corresponding counter is maintained to control the number of context coded bins that can be coded with Context-based Adaptive Binary Arithmetic Coding (CABAC) methods.

In some examples, when the number of context coded bins is larger than a threshold, context coded methods are disallowed.

In some examples, the threshold depends on the initial context and/or probability of syntax elements in a group.

In some examples, the threshold is signaled at at least one of SPS, PPS, Slice, Picture and Tile group level.

In some examples, the syntax elements are divided into different groups based on the initial context and/or probability of a syntax element.

In some examples, the syntax elements are divided into different groups based on where the syntax element is coded, wherein the syntax element is coded in partitioning level, in CU or PU or TU level or residual coding level.

In some examples, the grouping is changed dynamically.

In some examples, when the context for a syntax element is updated to be within a predefined context set, the syntax element is assigned to a certain group.

In some examples, regrouping is allowed based on the context and/or probability of each syntax element.

In some examples, regrouping is allowed when a number of samples have been coded since the last regrouping.

In some examples, regrouping is allowed when a given number of bits have been generated to the bitstream since the last regrouping.

In some examples, regrouping is allowed when a given number of CG have been processed since the last regrouping.

In some examples, regrouping is allowed when the probability difference in a group exceeds a certain threshold.

In some examples, regrouping is allowed when the number of context coded bin exceeds a certain threshold.

In some examples, regrouping is allowed when context and/or probability is re-initialized.

Figure 25:
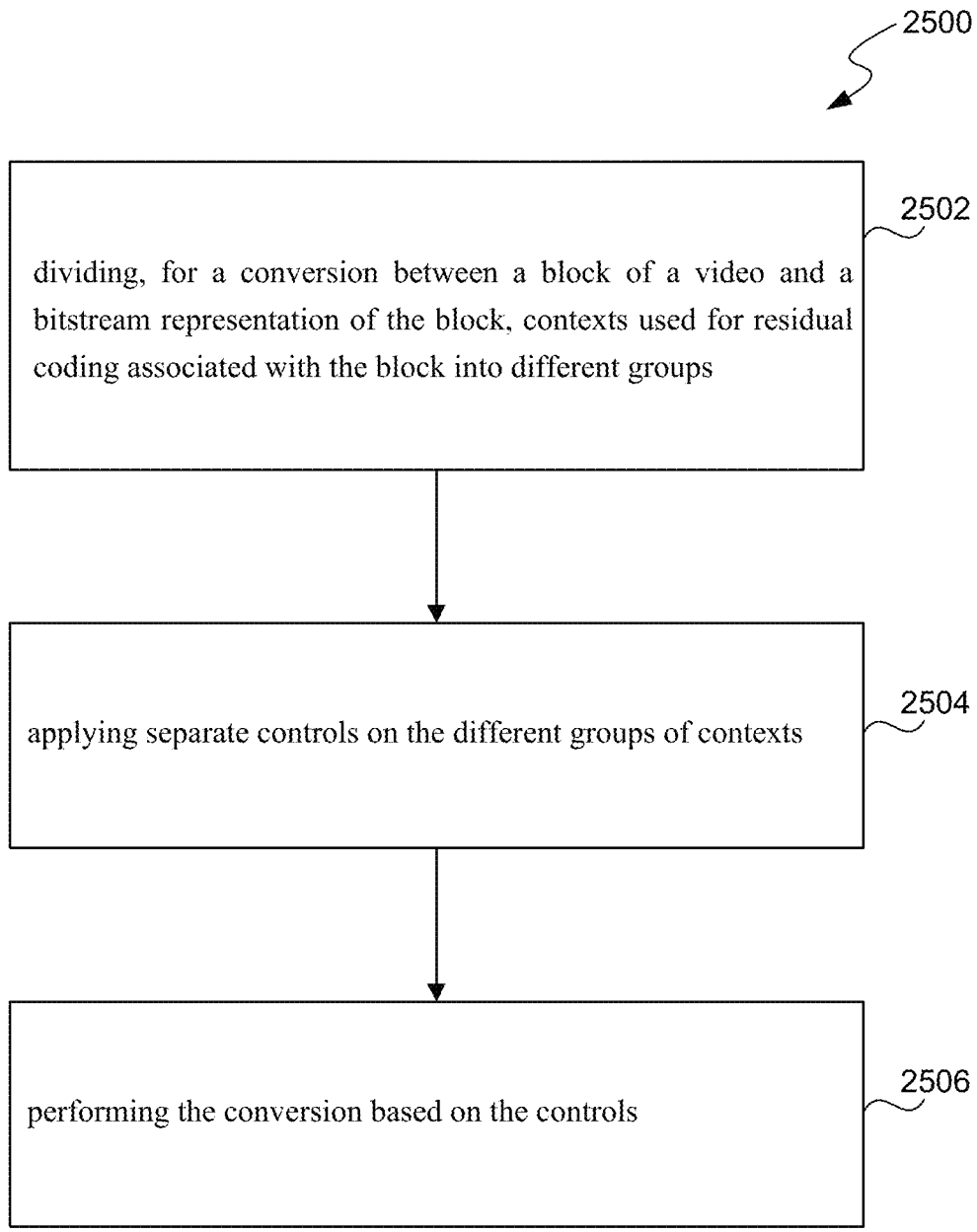
FIG. 25 shows a flowchart of an example method for video coding.

FIG. 25 is a flowchart for an example method 2500 of visual media processing. The method 2500 includes, at 2502, dividing, for a conversion between a block of a video and a bitstream representation of the block, contexts used for residual coding associated with the block into different groups; at 2504, applying separate controls on the different groups of contexts; and at 2506, performing the conversion based on the controls.

In some examples, different control strategies are applied to the different groups.

In some examples, the contexts are classified into N groups, wherein each group has a threshold to control whether context coded method can be applied, N being an integer.

In some examples, for one group of the N groups, a corresponding counter is maintained to control the number of context coded bins that can be coded with the contexts in the group.

In some examples, when the number of context coded bins is larger than a threshold, context coded methods with contexts in the group are disallowed.

In some examples, the threshold depends on the initial state and/or probability of contexts in a group.

In some examples, the threshold is signaled at at least one of SPS, PPS, Slice, Picture and Tile group level.

In some examples, the contexts are divided into different groups based on the initial state and/or probability of a context.

In some examples, the grouping is changed dynamically.

In some examples, when the state for a context is updated to be within a predefined state set, the context is assigned to a certain group.

In some examples, regrouping is allowed based on the state and/or probability of each context.

In some examples, regrouping is allowed when a number of samples have been coded since the last regrouping.

In some examples, regrouping is allowed when a given number of bits have been generated to the bitstream since the last regrouping.

In some examples, regrouping is allowed when a given number of CG have been processed since the last regrouping.

In some examples, regrouping is allowed when the probability difference in a group exceeds a certain threshold.

In some examples, regrouping is allowed when the number of context coded bin exceeds a certain threshold.

In some examples, regrouping is allowed when context and/or probability is re-initialized.

Figure 26:
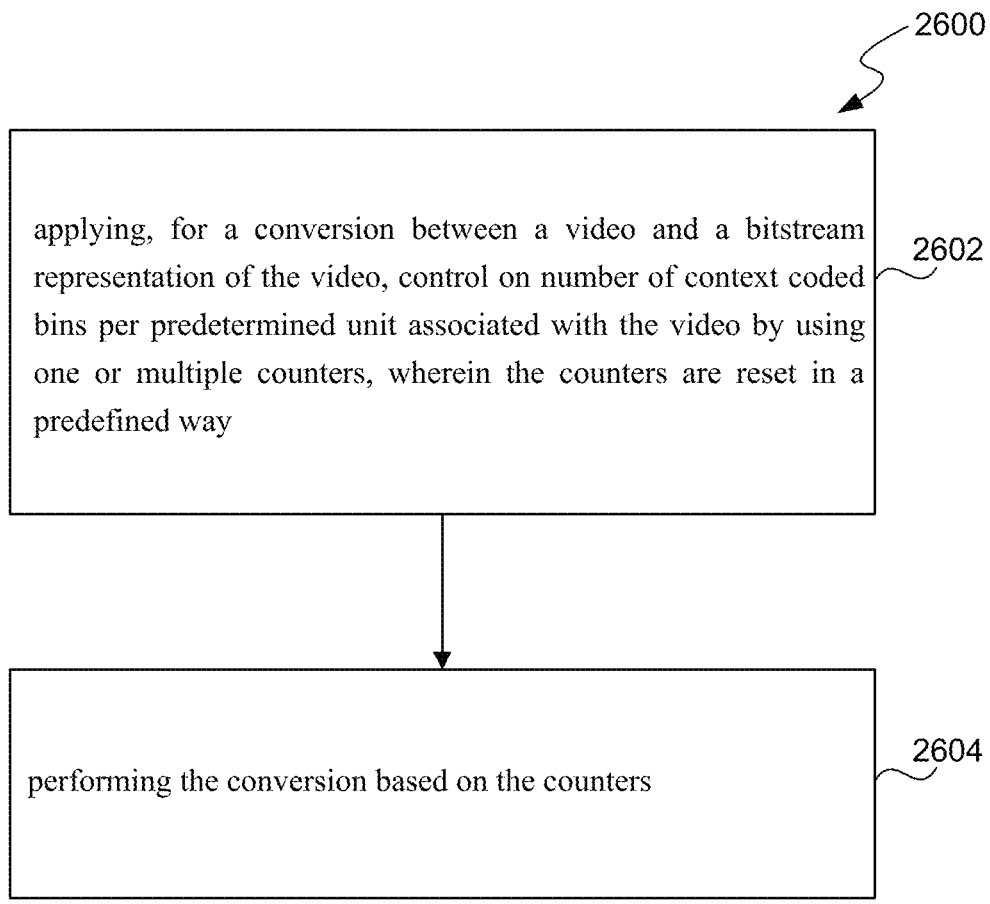
FIG. 26 shows a flowchart of an example method for video coding.

FIG. 26 is a flowchart for an example method 2600 of visual media processing. The method 2600 includes, at 2602, applying, for a conversion between a video and a bitstream representation of the video, control on number of context coded bins per predetermined unit associated with the video by using one or multiple counters, wherein the counters are reset in a predefined way; and at 2604, performing the conversion based on the counters.

In some examples, the predetermined unit includes a block which have block size of a width W and a height H, and the courters have a threshold of K*W*H, wherein K is a variable.

In some examples, the counter is reset when a given number of samples have been coded since the last counter reset.

In some examples, the counter is reset when a given number of bits have been generated to the bitstream since the last counter reset.

In some examples, the counter is reset when a given number of CG have been processed since the last counter reset.

In some examples, the counter is reset at each CTU row.

In some examples, the counter is reset at each tile group.

In some examples, the counter is reset at each tile.

In some examples, the counter is reset at each CTU.

In some examples, the counter is reset when receiving a certain flag.

In some examples, the flag is sent periodically to indicate if the counter should be reset or not.

In some examples, the flag is signaled at at least one of PPS, SPS, Picture, Tile group, Slice, CTU rows, CTU, CU, Block or Video brick level.

In some examples, the conversion generates the video from the bitstream representation.

In some examples, the conversion generates the bitstream representation from the video.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
dividing, for a conversion between a block of a video and a bitstream of the block, contexts used for residual coding associated with the block into different groups of contexts;
applying controls on the different groups of contexts separately; and
performing the conversion based on the controls,
wherein the contexts used for residual coding are divided into the different groups of contexts based on an initial state of the contexts and/or a probability of the contexts, and
wherein each of the different groups of contexts has a threshold to control whether a context coded method can be applied.

2. The method of claim 1, wherein different control strategies are applied to the different groups of contexts.

3. The method of claim 1, wherein, for one group of the different groups of contexts, a corresponding counter is maintained to control a number of context coded bins that can be coded with the contexts in the one group,
wherein, when the number of context coded bins is larger than a corresponding threshold, context coded methods with contexts in the one group are disallowed, and
wherein the threshold depends on the initial state and/or the probability of the contexts in the one group and is signaled at at least one of a sequence picture set (SPS) level, a picture parameter set (PPS) level, a slice level, a picture level, or a tile group level.

4. The method of claim 1, wherein grouping the contexts is changed dynamically, and wherein, when a state for a context is updated to be within a predefined state set, the context is assigned to a certain group.

5. The method of claim 4, wherein regrouping is allowed based on the state and/or the probability of each context.

6. The method of claim 5, wherein the regrouping is allowed in one of the following cases:
a number of samples have been coded since a last regrouping;
a given number of bits have been generated to the bitstream since the last regrouping;
a given number of coding groups have been processed since the last regrouping;
a probability difference in a group exceeds a first threshold;
a number of context coded bin exceeds a second threshold; or
the context and/or the probability is re-initialized.

7. The method of claim 1, further comprising:
dividing syntax elements associated with the block into different groups of syntax elements; and
applying the controls on the different groups of syntax elements separately.

8. The method of claim 7, wherein different control strategies are applied to the different groups of syntax elements.

9. The method of claim 8, wherein the syntax elements include context coded syntax elements for residual coding, wherein the context coded syntax elements are classified into N groups, wherein each group has a threshold to control whether context coded method can be applied, and wherein N is an integer.

10. The method of claim 9, wherein, for one group of the N groups, a corresponding counter is maintained to control a number of context coded bins that can be coded with Context-based Adaptive Binary Arithmetic Coding (CABAC) methods,
wherein, when the number of context coded bins is larger than a threshold, context coded methods are disallowed, and
wherein the threshold depends on an initial context and/or a probability of syntax elements in a group and is signaled at at least one of a sequence parameter set (SPS) level, a picture parameter set (PPS) level, a slice level, a picture level, or a tile group level.

11. The method of claim 7, wherein the syntax elements are divided into different groups based on an initial context and/or a probability of a syntax element.

12. The method of claim 7, wherein the syntax elements are divided into different groups based on where a syntax element is coded, and wherein the syntax element is coded in a partitioning level, a coding unit (CU) level, a prediction unit (PU) level, a transform unit (TU) level, or a residual coding level.

13. The method of claim 7, wherein grouping the syntax elements is changed dynamically, and wherein, when a context for a syntax element is updated to be within a predefined context set, the syntax element is assigned to a certain group.

14. The method of claim 13, wherein regrouping is allowed based on the context and/or the probability of each syntax element, and wherein the regrouping is allowed in one of the following cases:
a number of samples have been coded since a last regrouping;
a given number of bits have been generated to the bitstream since the last regrouping;
a given number of coding groups have been processed since the last regrouping;
a probability difference in a group exceeds a first threshold;
a number of context coded bin exceeds a second threshold; or
the context and/or the probability is re-initialized.

15. The method of claim 1, wherein the conversion includes encoding the block into the bitstream.

16. The method of claim 1, wherein the conversion includes decoding the block from the bitstream.

17. An apparatus for processing video data comprising a processor and a non-transitory memory with instructions thereon, wherein the instructions upon execution by the processor, cause the processor to:
divide, for a conversion between a block of a video and a bitstream of the block, contexts used for residual coding associated with the block into different groups of contexts, wherein the contexts used for residual coding are divided into the different groups of contexts based on an initial state of the contexts and/or a probability of the contexts;
apply controls on the different groups of contexts separately; and
perform the conversion based on the controls,
wherein each of the different groups of contexts has a threshold to control whether a context coded method can be applied.

18. A non-transitory computer-readable recording medium storing a bitstream of a video which is generated by a method performed by a video processing apparatus, wherein the method comprises:

dividing contexts used for residual coding associated with a block of the video into different groups of contexts;

applying controls on the different groups of contexts separately; and generating the bitstream based on the controls, wherein the contexts used for residual coding are divided into the different groups of contexts based on an initial state of the contexts and/or a probability of the contexts, and wherein each of the different groups of contexts has a threshold to control whether a context coded method can be applied.

19. The apparatus of claim 17, wherein, for one group of the different groups of contexts, a corresponding counter is maintained to control a number of context coded bins that can be coded with the contexts in the one group, wherein, when the number of context coded bins is larger than the threshold, context coded methods with the contexts in the one group are disallowed, wherein the threshold depends on the initial state and/or the probability of the contexts in the one group and is signaled at at least one of a sequence picture set (SPS) level, a picture parameter set (PPS) level, a slice level, a picture level, or a tile group level.

20. The non-transitory computer-readable recording medium of claim 18, wherein, for one group of the different groups of contexts, a corresponding counter is maintained to control a number of context coded bins that can be coded with the contexts in the one group, wherein, when the number of context coded bins is larger than the threshold, context coded methods with the contexts in the one group are disallowed, wherein the threshold depends on the initial state and/or the probability of the contexts in the one group and is signaled at at least one of a sequence picture set (SPS) level, a picture parameter set (PPS) level, a slice level, a picture level, or a tile group level.

* * * * *